US008654133B2

(12) United States Patent
Campbell et al.

(10) Patent No.: US 8,654,133 B2
(45) Date of Patent: *Feb. 18, 2014

(54) DYNAMIC LOAD BALANCING IN MULTIPLE VIDEO PROCESSING UNIT (VPU) SYSTEMS

(71) Applicant: ATI Technologies ULC, Markham (CA)

(72) Inventors: Jonathan L. Campbell, Orlando, FL (US); Maurice Ribble, Lancaster, MA (US)

(73) Assignee: ATI Technologies ULC, Markham, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/760,970

(22) Filed: Feb. 6, 2013

(65) Prior Publication Data
US 2013/0147814 A1 Jun. 13, 2013

Related U.S. Application Data

(63) Continuation of application No. 12/634,585, filed on Dec. 9, 2009, now Pat. No. 8,400,457, which is a continuation of application No. 11/139,893, filed on May 27, 2005, now Pat. No. 7,649,537.

(51) Int. Cl.
| G06F 15/16 | (2006.01) |
| G06F 15/80 | (2006.01) |
| G06F 13/00 | (2006.01) |
| G06T 1/20 | (2006.01) |
| G06K 9/36 | (2006.01) |

(52) U.S. Cl.
USPC ........... 345/502; 345/505; 345/506; 382/232; 710/104

(58) Field of Classification Search
None
See application file for complete search history.

(56) References Cited

U.S. PATENT DOCUMENTS

| 5,060,170 A | 10/1991 | Bourgeois et al. |
| 5,361,370 A | 11/1994 | Sprague et al. |
| 5,392,385 A | 2/1995 | Evangelisti et al. |
| 5,428,754 A | 6/1995 | Baldwin |

(Continued)

FOREIGN PATENT DOCUMENTS

| EP | 0712076 | 5/1996 |
| EP | 1347374 A2 | 9/2003 |
| GB | 2247596 | 3/1992 |

OTHER PUBLICATIONS

Furber, "VLSI RISC Architecture and Organisation," New York, Marcel Dekker, US, 1989, pp. 105-109. *(Cited in parent U.S. Appl. No. 12/634,585).

(Continued)

*Primary Examiner* — Tize Ma
(74) *Attorney, Agent, or Firm* — Volpe and Koenig, P.C.

(57) ABSTRACT

Systems and methods are provided for processing data. The systems and methods include multiple processors that each couple to receive commands and data, where the commands and/or data correspond to frames of video that include multiple pixels. An interlink module is coupled to receive processed data corresponding to the frames from each of the processors. The interlink module divides a first frame into multiple frame portions by dividing pixels of the first frame using at least one balance point. The interlink module dynamically determines a position for the balance point that minimizes differences between the workload of the processors during processing of commands and/or data of one or more subsequent frames.

11 Claims, 16 Drawing Sheets

(56) References Cited

U.S. PATENT DOCUMENTS

| | | | |
|---|---|---|---|
| 5,459,835 A | 10/1995 | Trevett | |
| 5,539,898 A | 7/1996 | Trevett et al. | |
| 6,191,800 B1 | 2/2001 | Arenburg et al. | |
| 6,243,107 B1 | 6/2001 | Valtin et al. | |
| 6,359,624 B1 | 3/2002 | Kunimatsu | |
| 6,377,266 B1 | 4/2002 | Baldwin | |
| 6,476,816 B1 | 11/2002 | Deming et al. | |
| 6,518,971 B1 | 2/2003 | Pesto, Jr. et al. | |
| 6,535,216 B1 | 3/2003 | Deming et al. | |
| 6,642,928 B1 | 11/2003 | Deming et al. | |
| 6,667,744 B2 | 12/2003 | Buckelew et al. | |
| 6,677,952 B1 | 1/2004 | Baldwin | |
| 6,720,975 B1 | 4/2004 | Dietrich, Jr. | |
| 6,809,733 B2 | 10/2004 | Mukherjee et al. | |
| 6,816,561 B1 | 11/2004 | Potter | |
| 6,885,376 B2 | 4/2005 | Tang-Petersen et al. | |
| 6,920,618 B2 | 7/2005 | Walls et al. | |
| 6,956,579 B1 | 10/2005 | Diard et al. | |
| 7,075,541 B2 | 7/2006 | Diard | |
| 7,649,537 B2 | 1/2010 | Campbell et al. | |
| 8,400,457 B2 * | 3/2013 | Campbell et al. | 345/502 |
| 2003/0071816 A1 | 4/2003 | Langendorf | |
| 2004/0210788 A1 | 10/2004 | Williams et al. | |
| 2005/0012749 A1 | 1/2005 | Gonzalez et al. | |
| 2005/0041031 A1 | 2/2005 | Diard | |
| 2005/0285865 A1 * | 12/2005 | Diamond | 345/520 |
| 2006/0267992 A1 | 11/2006 | Kelley et al. | |

OTHER PUBLICATIONS

Whitman, Scott, "Dynamic Load Balancing for Parallel Polygon Rendering," IEEE Computer Graphics and Applications, IEEE Service Center, 14(4):41-48, (1994). *(Cited in parent U.S. Appl. No. 12/634,585).

Yung et al., "Fast and Parallel Video Encoding by Workload Balancing," Systems, Man, and Cybernetics, IEEE International Conference in San Diego, CA, 5:4642-4647, (1998). *(Cited in parent U.S. Appl. No. 12/634,585).

Humphreys et al., "Chromium: A Stream-Processing Framework for Interactive Rendering on Clusters," ACM Transactions on Graphics ACM USA, 21(3):693-702, (2002). *(Cited in parent U.S. Appl. No. 12/634,585).

Molnar et al., "Pixelflow: High Speed Rendering Using IMAE Composition," Computer Graphics Proceedings, Annual Conference Series, 26(2):231-237, (1992).\ *(Cited in parent U.S. Appl. No. 12/634,585).

Correa et al., "Out-Of-Core Sort-First Parallel Rendering for Cluster-Based Tiled Displays," Parallel Computing, 29 (3):325-338, (2003). *(Cited in parent U.S. Appl. No. 12/634,585).

Humphreys et al., "WIREGL: A Scalable Graphics System for Clusters," Computer Graphics Siggraph, Conference Proceedings, Los Angeles, CA, Aug. 12-17, 2001, pp. 129-140. *(Cited in parent U.S. Appl. No. 12/634,585).

Stoll et al., "Lightning-2: A High-Performance Display Subsystem for PC Clusters," Computer Graphics, Siggraph 2001, Conference Proceedings, Los Angeles, CA Aug. 12-17, 2001, pp. 141-148. *(Cited in parent U.S. Appl. No. 12/634,585).

Nonaka et al., "Hybrid Hardware-Accelerated Image Composition for Sort-Last Parallel Rendering on Graphics Clusters with Commodity Image Compositor," Volume Visualization and Graphics, IEEE Symposium in Austin, TX, pp. 17-24. *(Cited in parent U.S. Appl No. 12/634,585).

Eldridge et al., "Pomergranate: A Fully Scalable Graphics Architecture," Computer Graphics, Siggraph 2000 Conference Proceedings, New Orleans, LA, Jul. 23-28, 2000, pp. 443-454. *(Cited in parent U.S. Appl. No. 12/634,585).

Leiserson et al., "The Network Architecture of the Connection Machine CM-05," SPAA 92 4th Annual ACM Symposium on Parallel Algorithms and Architectures ACEM, New York, NY, pp. 272-285, (1992). *(Cited in parent U.S. Appl. No. 12/634,585).

Molnar et al., "A Sorting Classification of Parallel Rendering," IEEE Computer Graphics and Applications, IEEE Service Center, 14(4):23-32, (1994). *(Cited in parent U.S. Appl. No. 12/634,585).

Feng et al., "Extending Open MP for Heterogeneous Chip Multiprocessors," Parallel Processing, 2003, Proceedings. 2003 International Conference on Oct. 6-9, 2003, Piscataway, NJ, pp. 161-168. *(Cited in parent U.S. Appl. No. 12/634,585).

Nvidia Corporation, "High Resolution Antialiasing Through Multisampling," Technical Brief, 9 pages, 2002. *(Cited in parent U.S. Appl. No. 12/634,585).

Lin et al., "An Anti-Aliasing Method for Parallel Rendering," Computer Graphics International, pp. 228-235, 1998. *(Cited in parent U.S. Appl. No. 12/634,585).

* cited by examiner

DYNAMIC LOAD BALANCING IN MULTIPLE VIDEO PROCESSING UNIT (VPU) SYSTEMS

CROSS REFERENCE TO RELATED APPLICATIONS

This application is a continuation of U.S. patent application Ser. No. 12/634,585 filed Dec. 9, 2009, which is a continuation of U.S. patent application Ser. No. 11/139,893, filed May 27, 2005, which issued as U.S. Pat. No. 7,649,537 on Jan. 19, 2010, which are hereby incorporated by reference in their entirety.

This application is related to the following United States patent applications:

Antialiasing System and Method, U.S. application Ser. No. 11/140,156, filed on May 27, 2005, which issued as U.S. Pat. No. 8,212,838, invented by Arcot J. Preetham, Andrew S. Pomianowski, and Raja Koduri;

Multiple Video Processing Unit (VPU) Memory Mapping, U.S. application Ser. No. 11/139,917, filed on May 27, 2005, which issued as U.S. Pat. No. 7,663,635, invented by Philip J. Rogers, Jeffrey Cheng, Dmitry Semiannokov, and Raja Koduri;

Applying Non-Homogeneous Properties to Multiple Video Processing Units (VPUs), U.S. application Ser. No. 11/140,163, filed on May 27, 2005, which issued as U.S. Pat. No. 8,054,314, invented by Timothy M. Kelley, Jonathan L. Campbell, and David A. Gotwalt;

Frame Synchronization in Multiple Video Processing Unit (VPU) Systems, U.S. application Ser. No. 11/140,114, filed on May 27, 2005, invented by Raja Koduri, Timothy M. Kelley, and Dominik Behr;

Synchronizing Multiple Cards in Multiple Video Processing Unit (VPU) Systems, U.S. application Ser. No. 11/139,744, filed on May 27, 2005, invented by Syed Athar Hussain, James Hunkins, and Jacques Vallieres;

Compositing in Multiple Video Processing Unit (VPU) Systems, U.S. application Ser. No. 11/140,165, filed on May 27, 2005, which issued as U.S. Pat. No. 7,613,346, invented by James Hunkins and Raja Koduri; and Computing Device with Flexibly Configurable Expansion Slots, and Method of Operation, U.S. application Ser. No. 11/140,040, filed on May 27, 2005, which issued as U.S. Pat. No. 7,539,801, invented by Yaoqiang (George) Xie and Roumen Saltchev.

Each of the foregoing applications is incorporated herein by reference in its entirety.

TECHNICAL FIELD

The invention is in the field of graphics and video processing.

BACKGROUND

Graphics and video processing hardware and software continue to become more capable, as well as more accessible, each year. Graphics and video processing circuitry is typically present on an add-on card in a computer system, but is also found on the motherboard itself. The graphics processor is responsible for creating the picture displayed by the monitor. In early text-based personal computers (PCs) this was a relatively simple task. However, the complexity of modern graphics-capable operating systems has dramatically increased the amount of information to be displayed. In fact, it is now impractical for the graphics processing to be handled by the main processor, or central processing unit (CPU) of a system. As a result, the display activity has typically been handed off to increasingly intelligent graphics cards which include specialized coprocessors referred to as graphics processing units (GPUs) or video processing units (VPUs).

In theory, very high quality complex video can be produced by computer systems with known methods. However, as in most computer systems, quality, speed and complexity are limited by cost. For example, cost increases when memory requirements and computational complexity increase. Some systems are created with much higher than normal cost limits, such as display systems for military flight simulators. These systems are often entire one-of-a-kind computer systems produced in very low numbers. However, producing high quality, complex video at acceptable speeds can quickly become prohibitively expensive for even "high-end" consumer-level systems. It is therefore an ongoing challenge to create VPUs and VPU systems that are affordable for mass production, but have ever-improved overall quality and capability.

Another challenge is to create VPUs and VPU systems that can deliver affordable, higher quality video, do not require excessive memory, operate at expected speeds, and are seamlessly compatible with existing computer systems.

INCORPORATION BY REFERENCE

All publications and patent applications mentioned in this specification are herein incorporated by reference to the same extent as if each individual publication or patent application was specifically and individually indicated to be incorporated by reference.

DETAILED DESCRIPTION

An improved system and method for video processing is described herein. Embodiments include a video processing system with at least one graphics processing unit (GPU) or video processing unit (VPU). As used herein, GPU and VPU are interchangeable terms. In various embodiments, rendering tasks are shared among the VPUs in parallel to provide improved performance and capability with minimal increased cost. Respective VPUs in the system cooperate to produce a frame to be displayed. In various embodiments, data output by different VPUs in the system is combined, or merged, or composited to produce a frame to be displayed. In one embodiment, the system is programmable such that various modes of operation are selectable, including various compositing modes, and various modes of task sharing or load balancing between multiple VPUs.

Figure 1:
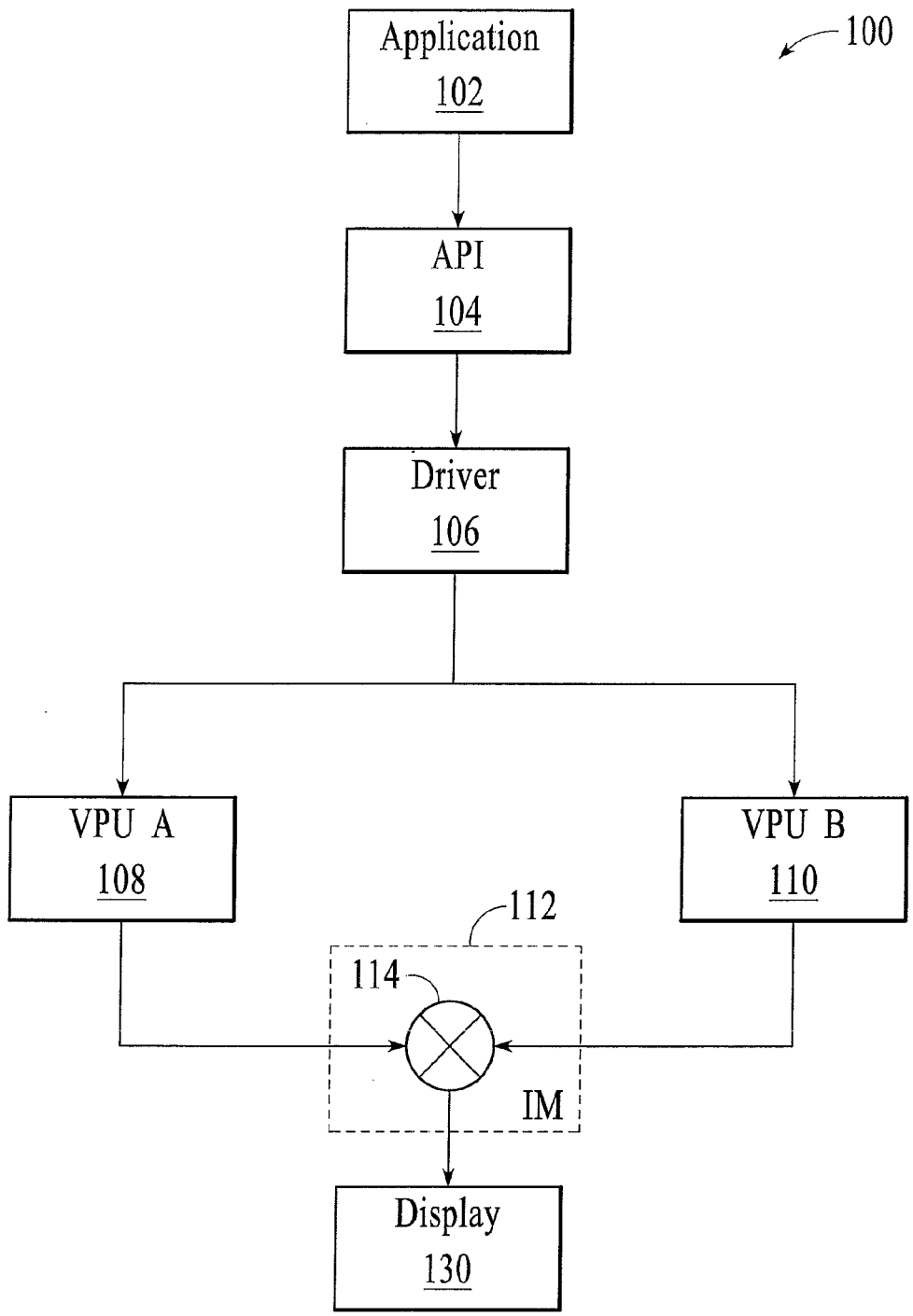
FIG. 1 is a block diagram of a video processing system according to an embodiment.

FIG. 1 is a block diagram of a video processing system 100 according to an embodiment. The system 100 includes an application 102. The application 102 is an end user application that requires video processing capability, such as a video game application. The application 102 communicates with application programming interface (API) 104. Several APIs are available for use in the video processing context. APIs were developed as intermediaries between the application software, such as the application 102, and video hardware on which the application runs. With new chipsets and even entirely new hardware technologies appearing at an increasing rate, it is difficult for applications developers to take into account, and take advantage of, the latest hardware features. It is also becoming impossible to write applications specifically for each foreseeable set of hardware. APIs prevent applications from having to be too hardware specific. The application can output graphics data and commands to the API in a standardized format, rather than directly to the hardware. Examples of available APIs include DirectX (from Microsoft) and OpenGL (from Silicon Graphics).

The API 104 can be any one of the available APIs for running video applications. The API 104 communicates with a driver 106. The driver 106 is typically written by the manufacturer of the video hardware, and translates the standard code received from the API into a native format understood by the hardware. The driver allows input from, for example, an application, process, or user to direct settings. Such settings include settings for selecting modes of operation, including modes of operation for each of multiple VPUs, and modes of compositing frame data from each of multiple VPUs, as described herein. For example, a user can select settings via a user interface (UI), including a UI supplied to the user with video processing hardware and software as described herein.

In one embodiment, the video hardware includes two video processing units, VPU A 108 and VPU B 110. In other embodiments there can be less than two or more than two VPUs. In various embodiments, VPU A 108 and VPU B 110 are identical. In various other embodiments, VPU A 108 and VPU B 110 are not identical. The various embodiments, which include different configurations of a video processing system, will be described in greater detail below.

The driver 106 issues commands to VPU A 108 and VPU B 110. The commands issued to VPU A 108 and VPU B 110 at the same time are for processing the same frame to be displayed. VPU A 108 and VPU B 110 each execute a series of commands for processing the frame. The driver 106 programmably instructs VPU A 108 and VPU B 110 to render frame data according to a variety of modes. For example, the driver 106 programmably instructs VPU A 108 and VPU B 110 to render a particular portion of the frame data. Alternatively, the driver 106 programmably instructs each of VPU A 108 and VPU B 110 to render the same portion of the frame data.

When either or both of VPU A 108 and VPU B 110 finishes executing the commands for the frame, the frame data is sent to a compositor 114. The compositor 114 is optionally included in an interlink module 112, as described more fully below. VPU A 108 and VPU B 110 cooperate to produce a frame to be displayed. In various embodiments, the frame data from each of VPU A 108 and VPU B 110 is combined, or merged, or composited in the compositor 114 to generate a frame to be rendered to a display 130. As used herein, the terms combine, merge, composite, mix, or interlink all refer to the same capabilities of the IM 112 and/or compositor 114 as described herein.

Figure 2:
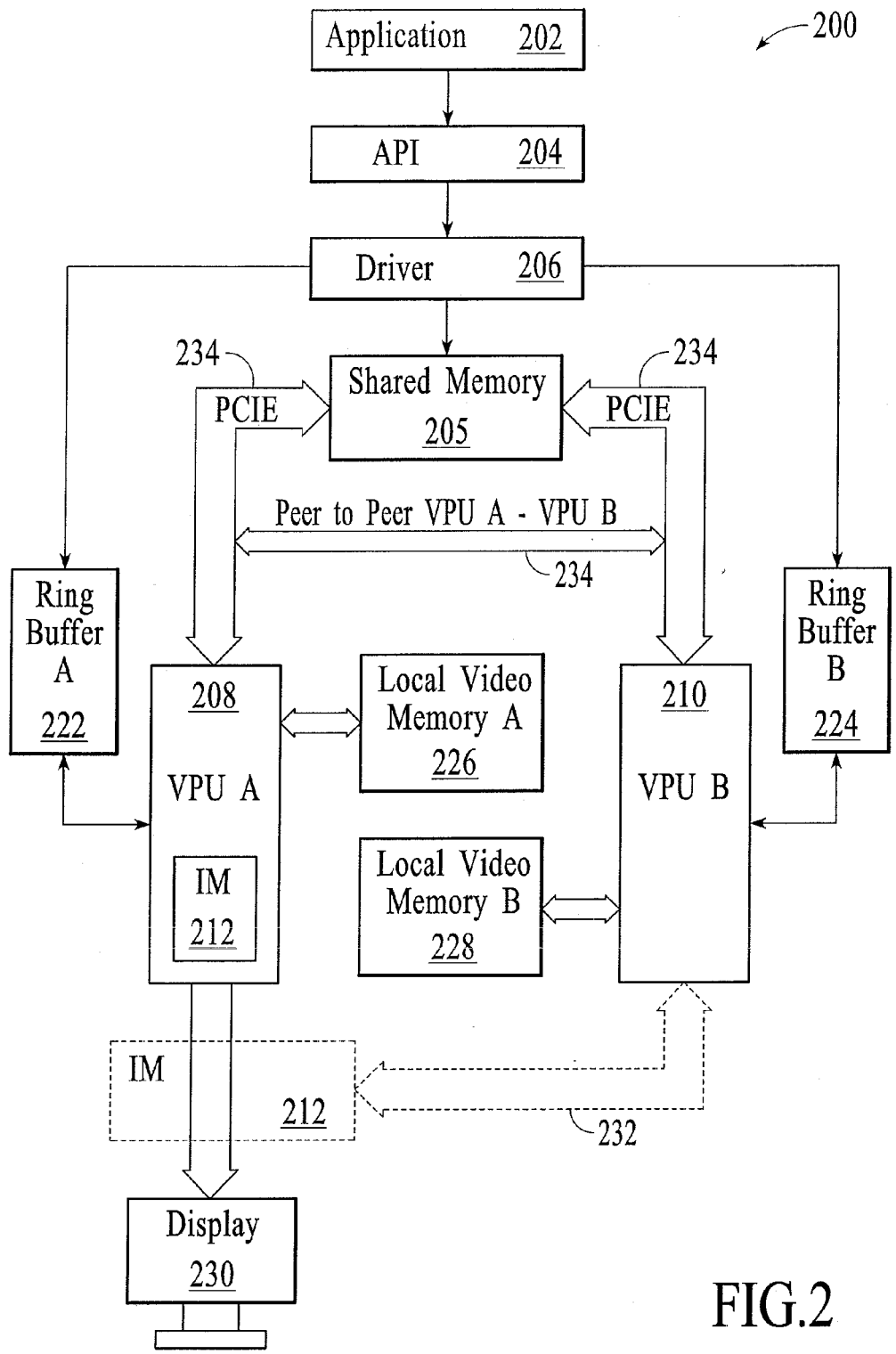
FIG. 2 is a more detailed block diagram of a video processing system according to an embodiment.

FIG. 2 is a block diagram of a system 200 according to an embodiment. The system 200 includes components or elements that may reside on various components of a video-capable computer system. In one embodiment an application 202, a driver 204, and a shared memory 205 reside on a host computer system, while remaining components reside on video-specific components, including one or more video cards, but the invention is not so limited. Any of the components shown could reside anywhere or, alternatively, various components could access other components remotely via a wired or wireless network. The application 202 is an end user application that requires video processing capability, such as a video game application. The application 202 communicates with application programming interface (APT) 204. The APT 204 can be any one of the available graphics, or video, or 3D APIs including DirectX (from Microsoft) and OpenGL (from Silicon Graphics).

The API 204 communicates with a driver 206. The driver 206 is written specifically for the system 200, and translates the standard code received from the API 204 into a native format understood by the VPU components, which will be explained more fully below.

In one embodiment, the system 200 further includes two VPUs, VPU A 208 and VPU B 210. The invention is not limited to two VPUs. Aspects of the invention as described herein would be workable with one VPU with modifications available to one of ordinary skill in the art. However, in most instances the system would be less efficient with one VPU than with more than one VPU. Various embodiments also include more than two VPUs. Systems with more than two are workable with modifications available to one of ordinary skill in the art, and in most instances would provide better efficiency than a system with two VPUs. In various embodiments VPU A 208 and VPU B 210 can be on one or more video cards that each includes a video processor and other associated hardware. As will be explained further below, the invention is not so limited. For example, more than one VPU can be resident on one card or board. However, as referred to herein a VPU is intended to include at least a video processor.

VPU A 208 and VPU B 210 receive commands and data from the driver 206 through respective ring buffers A 222, and B 224. The commands instruct VPU A 208 and VPU B 210 to perform a variety of operations on the data in order to ultimately produce a rendered frame for a display 230.

The driver 206 has access to a shared memory 205. In one embodiment, the shared memory 205, or system memory 205, is memory on a computer system that is accessible to other components on the computer system bus, but the invention is not so limited.

In one embodiment, the shared memory 205, VPU A 208 and VPU B 210 all have access to a shared communication bus 234, and therefore to other components on the bus 234. In one embodiment, the shared communication bus 234 is a peripheral component interface express (PCIE) bus, but the invention is not so limited.

The PCIE bus is specifically described in the following documents, which are incorporated by reference herein in their entirety:

PCI Express™, Base Specification, Revision 1.1, Mar. 28, 2005;

PCI Express™, Card Electromechanical Specification, Revision 1.1, Mar. 28, 2005;

PCI Express™, Base Specification, Revision 1.a, Apr. 15, 2003; and

PCI Express™, Card Electromechanical Specification, Revision 1.0a, Apr. 15, 2003.

The Copyright for all of the foregoing documents is owned by PCI-SIG.

In one embodiment, VPU A 208 and VPU B 210 communicate directly with each other using a peer-to-peer protocol over the bus 234, but the invention is not so limited. In other embodiments, there may be a direct dedicated communication mechanism between VPU A 208 and VPU B 210. In yet other embodiments, local video memory 226 and 227 may be shared, which may eliminate the need for some of the communications between VPU A 208 and VPU B 210.

VPU A 208 and VPU B 210 each have a local video memory 226 and 228, respectively, available. In various embodiments, one of the VPUs functions as a master VPU and the other VPU functions as a slave VPU, but the invention is not so limited. In other embodiments, the multiple VPUs could be peers under central control of another component. In one embodiment, VPU A 208 acts as a master VPU and VPU B 210 acts as a slave VPU.

In one such embodiment, various coordinating and combining functions are performed by an interlink module (IM) 212 that is resident on a same card as VPU A 208. This is shown as IM 212 enclosed with a solid line. In such an embodiment, VPU A 208 and VPU B 210 communicate with each other via the bus 234 for transferring inter-VPU communications (e.g., command and control) and data. For example, when VPU B 210 transfers an output frame to IM 212 on VPU A 208 for compositing (as shown in FIG. 1 for example), the frame is transferred via the bus 234.

In various other embodiments, the IM 212 is not resident on a VPU card, but is an independent component with which both VPU A 208 and VPU B 210 communicate. One such embodiment includes the IM 212 in a "dongle" that is easily connected to VPU A 208 and VPU B 210. This is indicated in the figure by the IM 212 enclosed by the dashed line. In such an embodiment, VPU A 208 and VPU B 210 perform at least some communication through an IM connection 232. For example, VPU A 208 and VPU B 210 can communicate command and control information using the bus 234 and data, such as frame data, via the IM connection 232.

There are many configurations of the system 200 contemplated as different embodiments of the invention. FIGS. 13-17 as described below illustrate just some of these embodiments.

Figure 3:
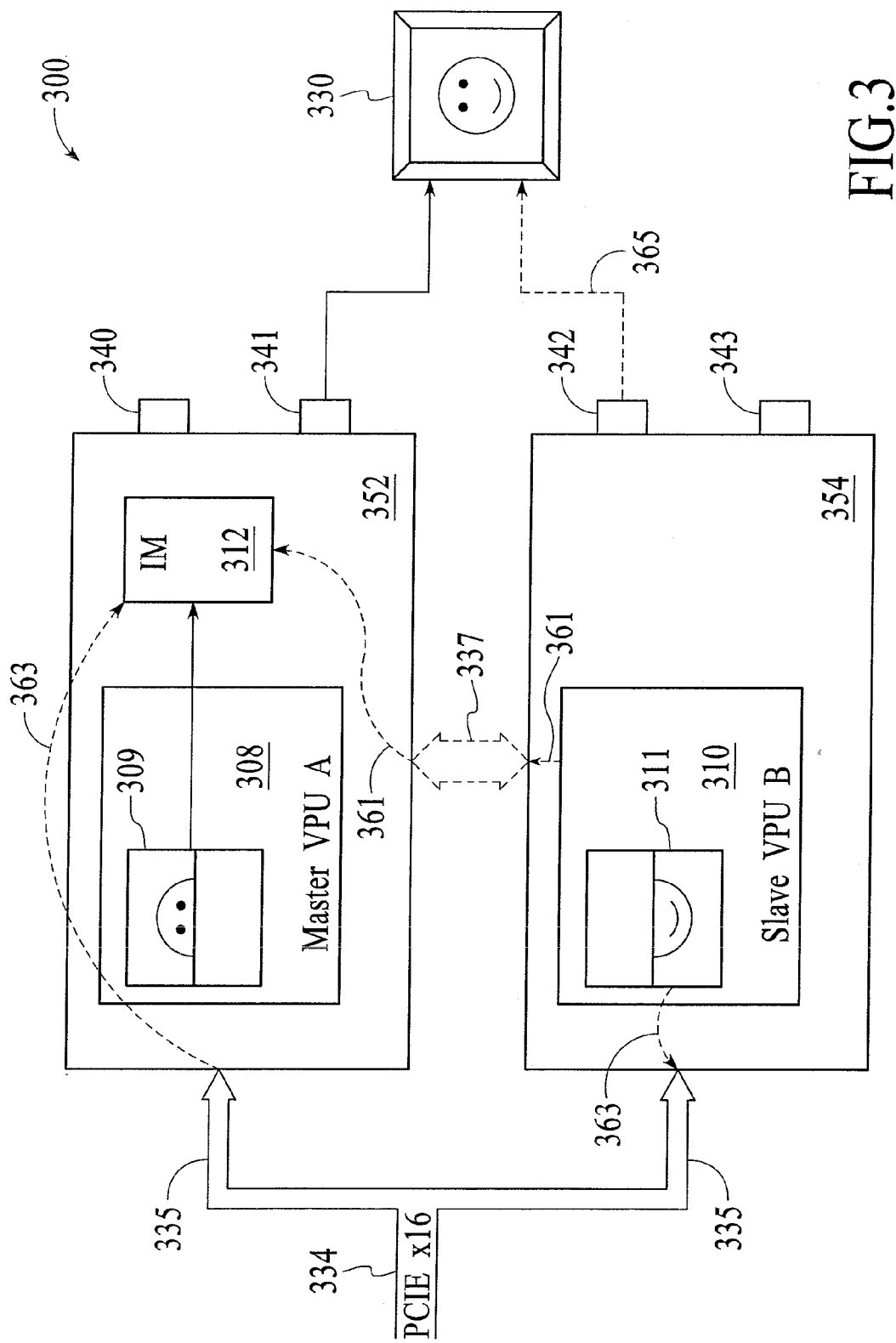
FIG. 3 is a block diagram of various components of a video processing system according to an embodiment.

FIG. 3 is a block diagram of various components of a system 300 according to an embodiment. The system 300 includes a master VPU card 352 and a slave VPU card 354. The master VPU card 352 includes a master VPU 308, and the slave VPU card 354 includes a slave VPU B 310. In one embodiment, VPUs 308 and 310 each communicate via a PICE bus 334. In one embodiment, the PCIE bus 334 is a X16 bus that is split into two X8 PCIE buses 335. In one embodiment, VPU A 308 and VPU B 310 communicate only through the bus 335. In alternative embodiments, VPU A 308 and VPU B 310 communicate partially through bus 335 and partially through dedicated intercard connection 337. In yet other embodiments, VPU A 308 and VPU B 310 communicate exclusively through the connection 337.

The master VPU card 352 includes an IM 312. In an embodiment in which VPU A 308 and VPU B 310 communicate via the bus 335, each VPU processes frame data as instructed by the driver. As an example in FIG. 3, the system 300 is performing video processing in a "scissoring" load balancing mode as described below. Master VPU A 308 generates an output 309 and slave VPU B 310 generates an output 311. The outputs 309 and 311 are input to the IM 312 for compositing, as described further below. In one embodiment, the slave VPU B 310 transfers its output 311 to the IM 312 via the buses 335 and 334 as shown by the dotted path 363. In one embodiment, the slave VPU B 310 transfers its output 311 to the IM 312 via the dedicated intercard connection 337 as shown by the dotted path 361. The IM 312 combines the outputs 309 and 111 to produce a frame for display. This frame is output to a display 330 by the IM 312 via a connector 341.

The master VPU card 352 includes connectors 340 and 341. The slave VPU card 354 includes connectors 342 and 343. Connectors 340, 341, 342 and 343 are connectors appropriate for the purpose of transmitting the required signals as known in the art. For example, the connector 341 is a digital video in (DVI) connector in one embodiment. There could be more or less than the number of connectors shown in the system 300.

In one embodiment, the various configurations described herein are configurable by a user to employ any number of available VPUs for video processing. For example, the system 300 includes two VPUs, but the user could choose to use only one VPU in a pass-through mode. In such a configuration, one of the VPUs would be active and one would not. In such a configuration, the task sharing or load balancing as described herein would not be available. However, the enabled VPU could perform conventional video processing. The dotted path 365 from VPU card B 354 to the display 330 indicates that slave VPU B 310 can be used alone for video processing in a pass-through mode. Similarly, the master VPU A 308 can be used alone for video processing in a pass-through mode.

Figure 4:
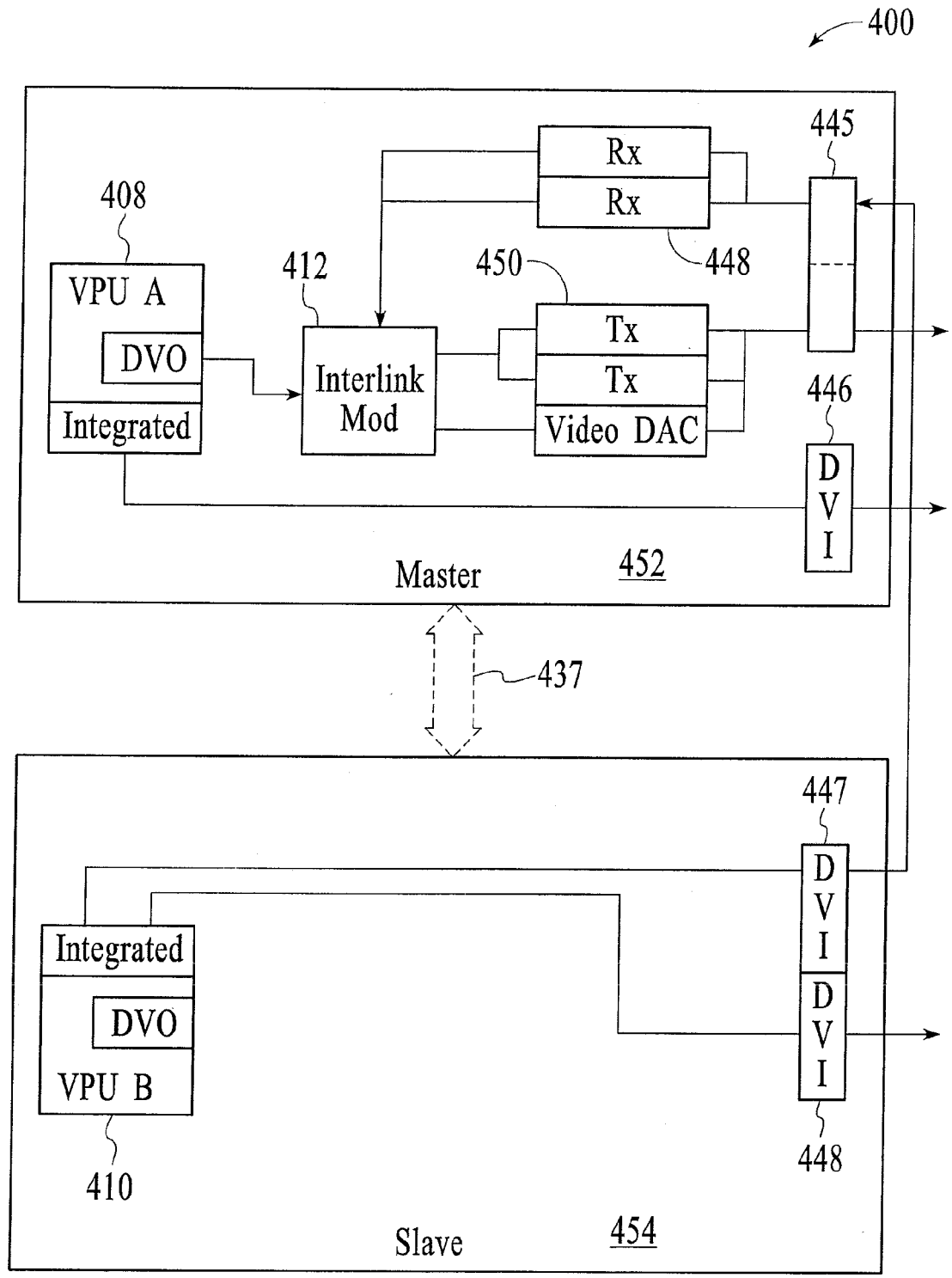
FIG. 4 is a more detailed block diagram of a video processing system, which is a configuration similar to that of FIG. 3 according to an embodiment.

FIG. 4 is a more detailed block diagram of a system 400, which is a configuration similar to that of FIG. 3 according to an embodiment. The system 400 includes two VPU cards, a master VPU card 452 and a slave VPU card 454. The master VPU card 452 includes a master VPU A 408, and the slave VPU card 454 includes a slave VPU B 410.

The master VPU card 452 also includes a receiver 448 and a transmitter 450 for receiving and transmitting, in one embodiment, TDMS signals. A dual connector 445 is a DMS connector in an embodiment. The master card further includes a DVI connector 446 for outputting digital video signals, including frame data, to a display. The master VPU card 452 further includes a video digital to analog converter (DAC). An interlink module (IM) 412 is connected between the VPU A 408 and the receivers and transmitters as shown. The VPU A 408 includes an integrated transceiver (labeled "integrated") and a digital video out (DVO) connector.

The slave VPU card 454 includes two DVI connectors 447 and 448. The slave VPU B 410 includes a DVO connector and an integrated transceiver. As an alternative embodiment to communication over a PCIE bus (not shown), the master VPU card 452 and the slave VPU card 454 communicate via a dedicated intercard connection 437.

Figure 5:
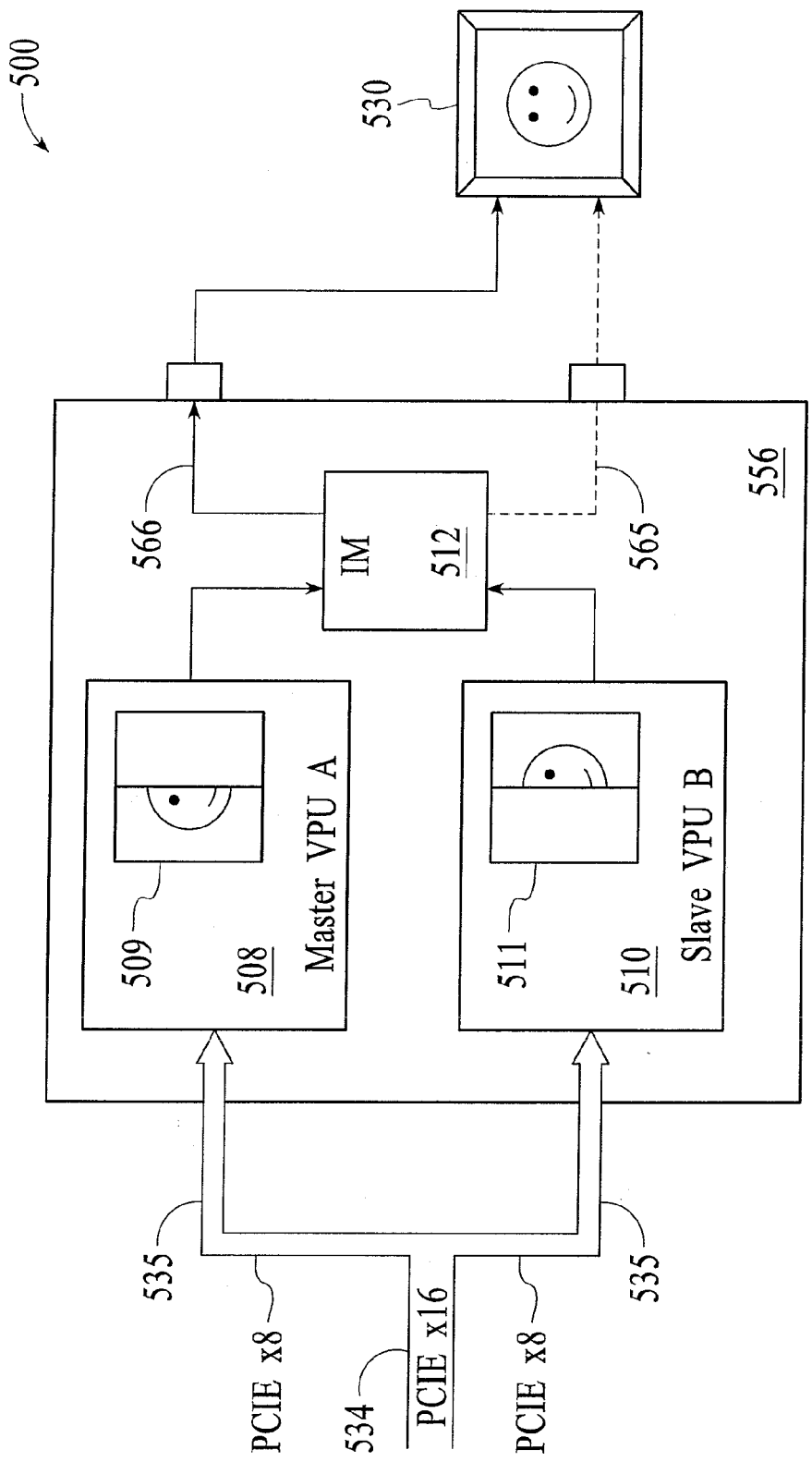
FIG. 5 is a diagram of a one-card video processing system according to an embodiment.
Figure 6:
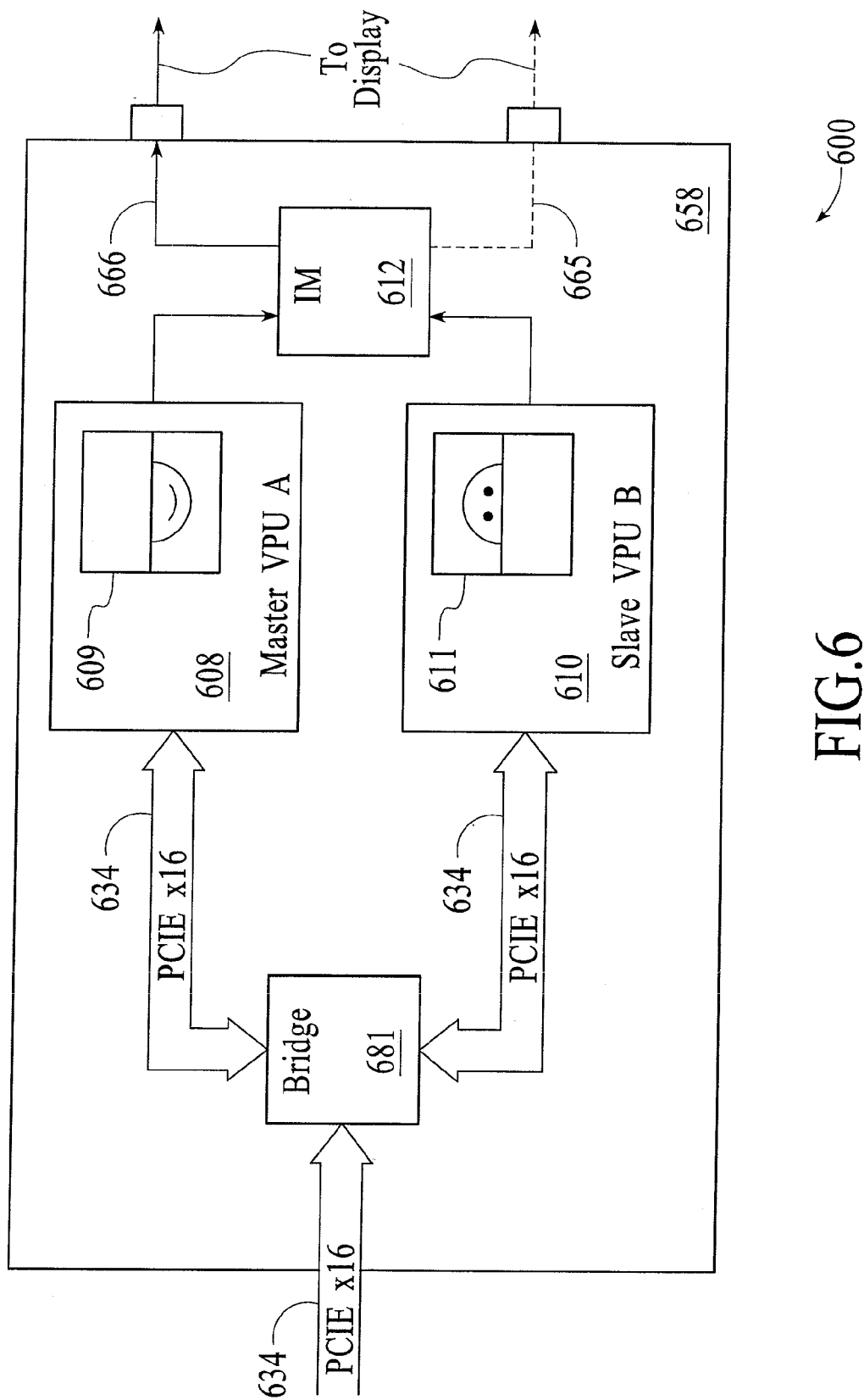
FIG. 6 is a diagram of a one-card video processing system according to an embodiment.
Figure 7:
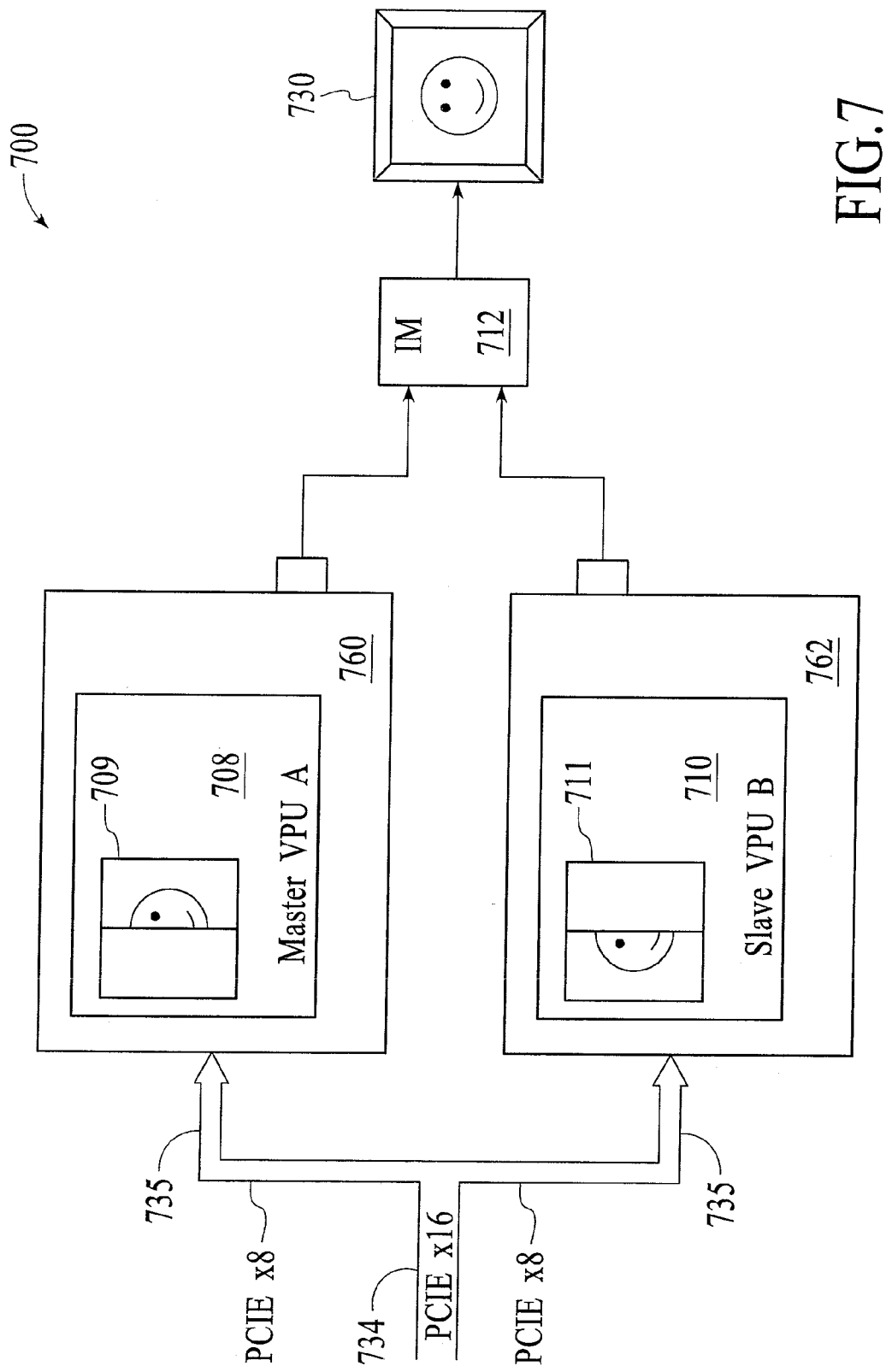
FIG. 7 is a diagram of a two-card video processing system according to an embodiment.

FIGS. 5-7 are diagrams of further embodiments of system configurations. FIG. 5 is a diagram of a one-card system 500 according to an embodiment. The system 500 includes a "supercard" or "monstercard" 556 that includes more than one VPU. In one embodiment, the supercard 556 includes two VPUs, a master VPU A 508 and a slave VPU B 510. The supercard 556 further includes an IM 512 that includes a compositor for combining or compositing data from both VPUs as further described below. It is also possible, in other embodiments, to have a dedicated on-card inter-VPU connection for inter-VPU communication (not shown). In one embodiment, the master VPU A 508 and the slave VPU B 510 are each connected to an X8 PCIE bus 535 which comes from a X16 PCIE bus 534.

The system 500 includes all of the multiple VPU (also referred to as multiVPU) functionality described herein. For example, the master VPU A 508 processes frame data as instructed by the driver, and outputs processed frame data 509 to the IM 512. The slave VPU B 510 processes frame data as instructed by the driver, and outputs processed frame data 511, which is transferred to the IM 512 for combining or compositing. The transfer is performed via the PCIE bus 534 or via a dedicated inter-VPU connection (not shown), as previously described with reference to system 300. In either case, the composited frame is output from the IM 512 to a display 530.

It is also possible to disable the multiVPU capabilities and use one of the VPUs in a pass-through mode to perform video processing alone. This is shown for example by the dashed path 565 which illustrates the slave VPU B 510 connected to a display 530 to output frame data for display. The master VPU A 508 can also operate alone in pass-through mode by outputting frame data on path 566.

FIG. 6 is a diagram of a one-card system 600 according to an embodiment. The system 600 includes a "supercard" or "monstercard" 658 that includes more than one VPU. In one embodiment, the supercard 658 includes two VPUs, a master VPU A 608 and a slave VPU B 610. The supercard 658 further includes an IM 612 that includes a compositor for combining or compositing data from both VPUs as described herein. It is also possible, in other embodiments, to have a dedicated on-card inter-VPU connection for inter-VPU communication (not shown). In one embodiment, the master VPU A 608 and the slave VPU B 610 are each connected to a X16 PCIE bus 634 through an on-card bridge 681.

The system 600 includes all of the multiVPU functionality described herein. For example, the master VPU A 608 processes frame data as instructed by the driver, and outputs processed frame data 609 to the IM 612. The slave VPU B 610 processes frame data as instructed by the driver, and outputs processed frame data 611, which is transferred to the IM 612 for combining or compositing. The transfer is performed via the PCIE bus 634 or via a dedicated inter-VPU connection (not shown), as previously described with reference to system 300. In either case, the composited frame is output from the IM 612 to a display (not shown).

It is also possible to disable the multiVPU capabilities and use one of the VPUs in a pass-through mode to perform video processing alone. This is shown for example by the dashed path 665 which illustrates the slave VPU B 610 connected to an output for transferring a frame for display. The master VPU A 608 can also operate alone in pass-through mode by outputting frame data on path 666.

FIG. 7 is a diagram of a two-card system 700 according to an embodiment. The system 700 includes two peer VPU cards 760 and 762. VPU card 760 includes a VPU A 708, and VPU card 762 includes a VPU 710. In one embodiment, VPU A 708 and VPU 710 are identical. In other embodiments VPU A 708 and VPU B 710 are not identical. VPU A 708 and VPU 710 are each connected to an X8 PCIE bus 735 that is split from a X16 PCIE bus 734. VPU A 708 and VPU 710 are further each connected to output data through a card connector to an interlink module (IM) 712. In one embodiment, the IM 712 is an integrated circuit in a "dongle" that is easily connectable to VPU card 760 and VPU card 762. In one embodiment, the IM 712 is an integrated circuit specifically designed to include all of the compositing functionality described herein. The IM 712 merges or composites the frame data output by VPU A 708 and VPU 710 and outputs a displayable composited frame to a display 730.

Figure 8:
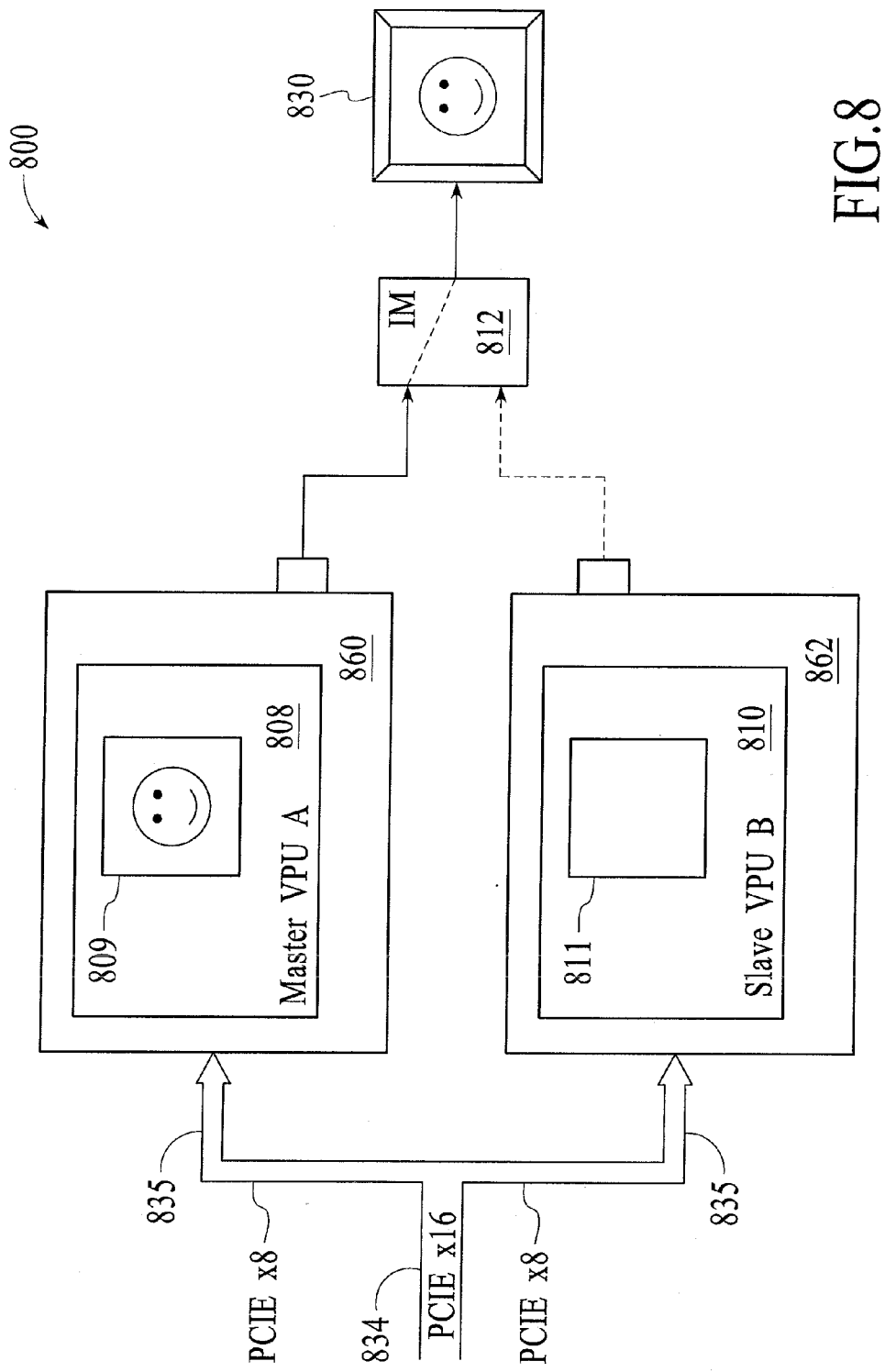
FIG. 8 is a diagram of a two-card video processing system according to an embodiment.

FIG. 8 is a diagram of a two-card system 800 according to an embodiment. The system 800 is similar to the system 700, but is configured to operate in a by-pass mode. The system 800 includes two peer VPU cards 860 and 862. VPU card 860 includes a VPU A 808, and VPU card 862 includes a VPU B 810. In one embodiment, VPU A 808 and VPU B 810 are identical. In other embodiments VPU A 808 and VPU B 810 are not identical. VPU A 808 and VPU B 810 are each connected to an X8 PCIE bus 835 that is split from a X16 PCIE bus 834. VPU A 808 and VPU B 810 are further each connected through a card connector to output data to an interlink module (IM) 812. In one embodiment, the IM 812 is an integrated circuit in a "dongle" that is easily connectable to VPU card 860 and VPU card 862. In one embodiment, the IM 812 is an integrated circuit specifically designed to include all of the compositing functionality described herein. The IM 812 is further configurable to operate in a pass-through mode in which one of the VPUs operates alone and the other VPU is not enabled. In such a configuration, the compositing as described herein would not be available. However, the enabled VPU could perform conventional video processing. In system 800, VPU A 808 is enabled and VPU B 810 is disabled, but either VPU can operate in by-pass mode to output to a display 830.

The configurations as shown herein, for example in FIGS. 3-8, are intended as non-limiting examples of possible embodiments. Other configurations are within the scope of the invention as defined by the claims. For example, other embodiments include a first VPU installed on or incorporated in a computing device, such as a personal computer (PC), a notebook computer, a personal digital assistant (PDA), a TV, a game console, a handheld device, etc. The first VPU can be an integrated VPU (also known as an integrated graphics processor, or IGP), or a non-integrated VPU. A second VPU is installed in or incorporated in a docking station or external enclosed unit. The second VPU can be an integrated VPU or a non-integrated VPU.

In one embodiment, the docking station is dedicated to supporting the second VPU. The second VPU and the first VPU communicate as described herein to cooperatively perform video processing and produce an output as described. However, in such an embodiment, the second VPU and the first VPU communicate via a cable or cables, or another mechanism that is easy to attach and detach. Such an embodiment is especially useful for allowing computing devices which may be physically small and have limited video processing capability to significantly enhance that capability through cooperating with another VPU.

It will be appreciated by those of ordinary skill in the art that further alternative embodiments could include multiple VPUs on a single die (e.g., two VPUs on a single die) or multiple cores on a single silicon chip.

Figure 9:
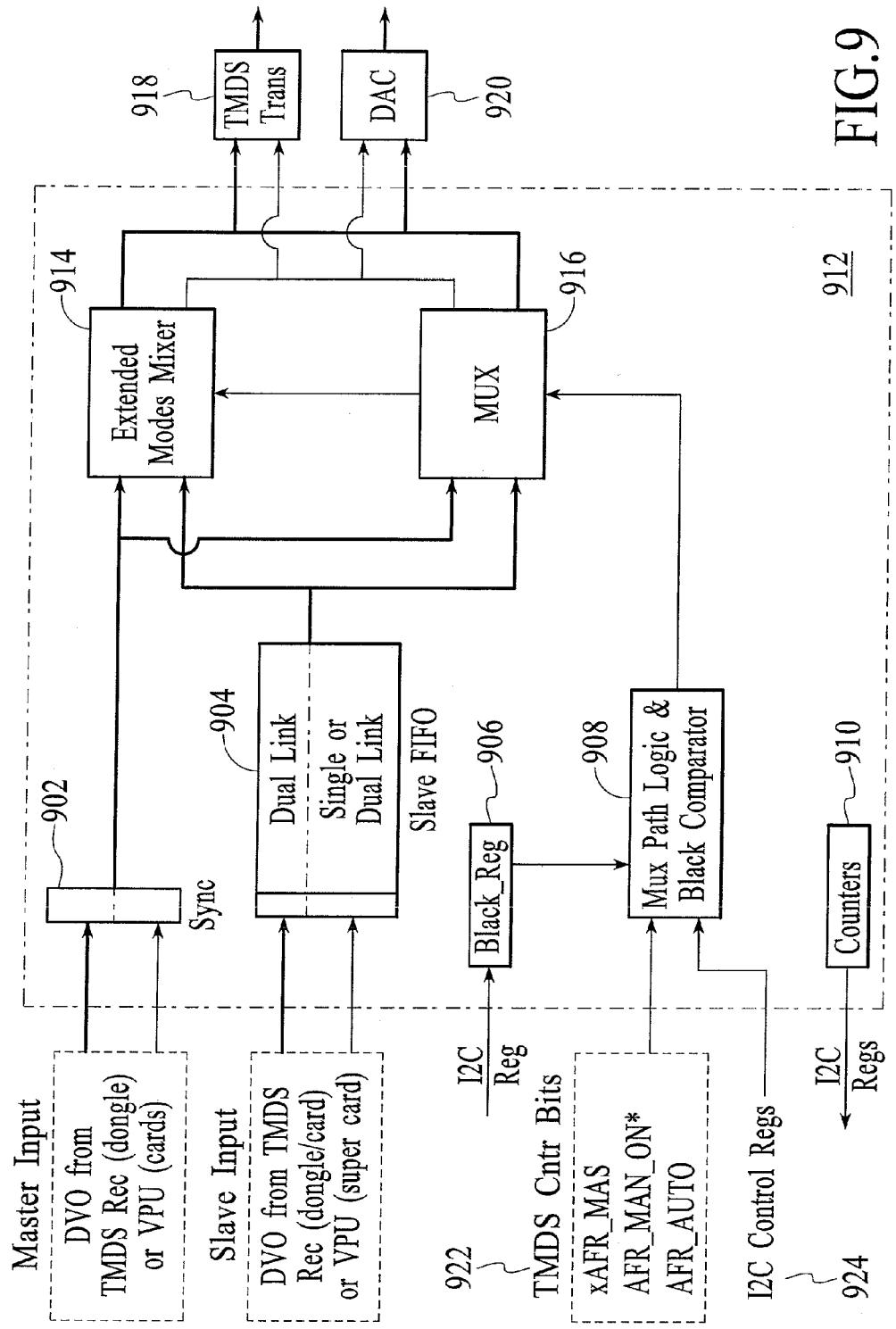
FIG. 9 is a block diagram of an interlink module (IM) according to an embodiment.

FIG. 9 is a block diagram of an interlink module (IM) 912 according to an embodiment. All rendering commands are fetched by each VPU in the system. In any one of the multi-VPU configurations described herein, after the VPUs execute the fetched commands, the IM 912 merges the streams of pixels and control lines from the multiple VPUs and outputs a single digital video output (DVO) stream.

The IM 912 includes a master input port that receives a DVO stream from a master VPU. The master VPU input can be from a TDMS receiver in a "dongle" configuration such as those shown in systems 700 and 800. The master VPU input can alternatively come from a master VPU on a master VPU card in a multi-card configuration, as shown for example in systems 300 and 400. A synchronization register 902 receives the DVO data from the master VPU.

The IM 912 further includes a slave input port that receives a DVO stream from a slave VPU. The slave VPU input can be from a TDMS receiver in a "dongle" configuration such as those shown in systems 700 and 800 or a card configuration as in systems 300 and 400. The slave VPU input can alternatively come from a slave VPU on a "super" VPU card configuration, as shown for example in systems 500 and 600. The IM 912 includes FIFOs 904 on the slave port to help synchronize the input streams between the master VPU and the slave VPU.

The input data from both the master VPU and the slave VPU are transferred to an extended modes mixer 914 and to a multiplexer (MUX) 916. The IM 912 is configurable to operate in multiple compositing modes, as described herein. When the parts of the frame processed by both VPUs are combined, either by the extended modes mixer 914, or by selecting only non-black pixels for display, as further described below, the entire frame is ready to be displayed.

Control logic determines which compositing mode the IM 912 operates in. Depending on the compositing mode, either the extended modes mixer 914 or the MUX 916 will output the final data. When the MUX 916 is used, control logic including a black register 906 and a MUX path logic and black comparator 908, determines which master or slave pixel is passed through the MUX 916. Data is output to a TDMS transmitter 918 or a DAC 920.

The black register is used to allow for control algorithms to set a final black value that has been gamma adjusted.

In one embodiment, the inter-component communication among the VPUs and the IM 912 includes I2C buses and protocols.

Operating modes, including compositing modes, are set through a combination of I2C register bits 924 and TMDS control bits 922 as shown in Table 1.

TABLE 1

Operational Modes and Control Bits

| Category Main | Sub | I2C Bits | TMDS Cntr Bits | Notes |
|---|---|---|---|---|
| Passthru | Slave | INTERLINK_ENABLE = 0<br>CONTROL_BITS_2: Bit 3 = x | n/a | Uses 1$^{st}$ I2C access to determine path |
| Passthru | Master | INTERLINK_ENABLE = 0<br>CONTROL_BITS_2: Bit 3 = x | n/a | Uses 1$^{st}$ I2C access to determine path |
| Interlink | AFR_MANUAL | INTERLINK_ENABLE = 1<br>CONTROL_BITS_2: Bit 3 = 0 | AFR_MAN_ON* = 0<br>AFR_AUTO* = 1 | xAFR_MAS state changes controls the next data path |
| Interlink | AFR_AUTO | INTERLINK_ENABLE = 1<br>CONTROL_BITS_2: Bit 3 = 0 | AFR_MAN_ON* = 0<br>AFR_AUTO* = 0 | |
| Interlink | BLACKING | INTERLINK_ENABLE = 1<br>CONTROL_BITS_2: Bit 3 = 0 | AFR_MAN_ON* = 1<br>AFR_AUTO* = x | Uses black pixels to determine data path |
| Interlink | Super AA | INTERLINK_ENABLE = x<br>CONTROL_BITS_2: Bit 3 = 1 | n/a | CONTROL_BITS_2: Bit 4-7 determines extended mode |

There are two separate data paths through the IM 912 according to an embodiment. The two input pixel streams from the respective VPUs are either processed through the MUX 916 (in pass-through mode, or "standard" interlink modes), or through the mixer 914 in extended modes. In one embodiment, the extended modes include a super antialiasing mode, or "SuperAA mode", as described in copending U.S. patent application Ser. No. 11/140,156, titled "Antialiasing System and Method", which is hereby incorporated by reference in its entirety.

In the MUX 916, just one pixel from either VPU A or VPU B is selected to pass through, and no processing of pixels is involved. In the extended modes mixer 914, processing is done on a pixel by pixel basis. In the SuperAA mode, for example, the pixels are processed, averaged together, and reprocessed. In one embodiment, the processing steps involve using one or more lookup tables to generate intermediate or final results.

The selection between the MUX 916 path and the mixer 914 path is determined by I2C register bits and control bits. For example, the mixer 914 path is selected if:
  ENABLE_INTERLINK=1 (I2C register)
  and CONTROL_BITS_2: Bit 3 and Bit 4=1 (Extended-Modes and SuperAA) (else MUX).

In one embodiment, the IM has three ports, two input ports and one output port.

The output port configuration is split into two parts. The DAC is driven across a 24 bit single data rate (SDR) interface. The TMDS is driven with a double data rate (DDR) interface; a 12 pin interface for TMDS single link, and a 24 pin interface for TMDS dual link. The I2C control bit registers determines this configuration.

There are three primary pixel clock domains. Both the master and slave inputs come in on their own separate domains. The IM uses the DVO clock domain for all internal paths and the final output. The DVO clock is generated by the active input port in pass-through mode and from the master input clock in interlink mode.

The master input bus (data and control) goes through a synchronizer as it passes into the DVO clock domain, imparting a 2-4 clock delay. The slave input bus (data and control) goes into a FIFO which is synchronized on its output to the DVO clock domain. The outputs of both paths are routed to a MUX or extended modes mixer which then outputs a single bus width data output.

In slave pass-through mode the slave FIFO is set into pass-through mode, while in interlink mode, it is used as a standard FIFO. For slave pass-through mode, the control bits go through the FIFO with the pixel data. In interlink mode, sAFR_MAS goes through with the data, and the control bits are ignored from the slave input port.

I/Os that use DDR clocking are split into double wide buses (e.g., 12-bit DDR input becomes 24 bits internally). This is to avoid having to run the full clock speed through the IM.

In one embodiment, there is one FIFO on the IM, located on the slave channel. Twenty-four (24) bits of pixel data flow through the FIFO in single TMDS mode, and 48 bits of data flow through the FIFO in dual TMDS mode. The slave port's control bits are also carried through this FIFO when in pass-through mode, slave path. When in interlink mode, the control bits are ignored, and instead of the control bits the sAFR_MAS bit is carried through in parallel with the pixel data.

When in single link TMDS mode (CONTROL_BITS: Dual_Link_Mode bit=0), the extra 24 bits of data for dual link are not clocked to conserve power.

On power up the FIFOs should be set to empty. FIFOs are also cleared when the ENABLE_INTERLINK bit toggles to 1 or if the CONTROL_ONESHOTS:FIFO_Clear bit is set to 1.

The slave FIFO has two watermarks (registers FIFO_FILL, FIFO_STOP). The IM drives the SlavePixelHold pin depending on how full the FIFO is and the values in these registers. If the slave FIFO has FIFO_FILL or fewer entries in use, the SlavePixelHold should go low. If the slave FIFO has FIFO_STOP or more entries in use, the SlavePixelHold should go high.

Figure 10:
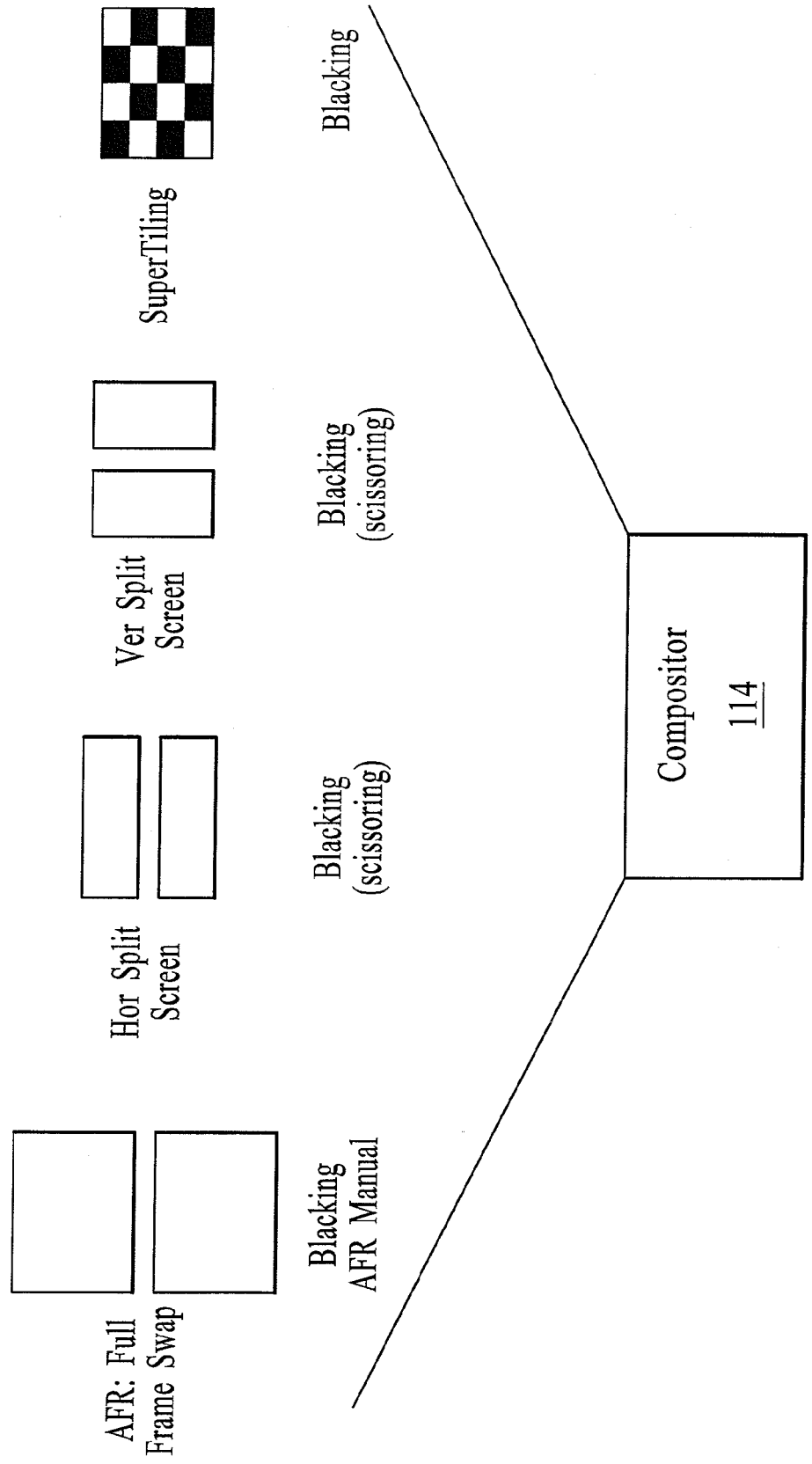
FIG. 10 is a diagram illustrating various load balancing modes according to an embodiment.

"Load balancing" refers to how work is divided by a driver for processing by multiple system VPUs. In various embodiments, the processed data output by each VPU is composited according to one of multiple compositing modes of the IM 12, also referred to herein as "interlinking modes" and "compositing modes". The IM 12 supports numerous methods for load balancing between numerous VPUs, including super-tiling, scissoring and alternate frame rendering ("AFR"), all of which are components of "Blacking". These modes are described below. FIG. 10 is a diagram illustrating various load balancing modes performed by the system as described. Frame data from various VPUs in the system is processed according to a load balancing mode and composited in a compositor 114, as described herein, to generate a displayable frame. Alternative embodiments of the IM may use any of the compositing modes in any combination across any number of VPUs.

For Super-Tiling, software driver control determines the tile size and alternates between image data and black tiles so that, between the master and slave VPUs, each frame is fully painted. The IM 112 passes through the non-black pixels (image data) creating a super tiling-type split between the master and slave inputs. The tile sizes can be dynamically adjusted every pair of master and slave frames if desired. Super-Tiling may divide a display screen into a chess board pattern for which each square/tile is 32×32, pixels for example. The image tiles are rendered on a first VPU of a multi-VPU system while the black tiles are rendered on a second VPU. Super-Tiling provides fine grain load sharing for pixel processing within a frame of rendering, a more even distribution of pixel load relative to other load balancing methods, and less complex driver implementation.

Scissoring divides a display screen into two parts, and this division can be horizontal or vertical. While a horizontal split may be more convenient when considering software implementation and data transfer flexibility, a vertical split may provide better load balancing. In the context of multiple VPUs, scissoring provides optimization opportunities in the direction of parallelizing data transfers with 3D rendering. Scissoring also supports methods in which the slave VPU (which performs the majority of data transfers) does less work than the master VPU, thereby facilitating dynamic load balancing schemes between the master and the slave VPUs.

Scissoring includes both Vertical Split Screen Blacking Control and Horizontal Split Screen Blacking Control. With Vertical Split Screen Blacking Control, the drivers determine which side of a frame are output from the master and slave VPU, so that between the two VPUs every frame is completely painted. The part of a frame that each VPU does not handle is cleared to black by the drivers. The IM 912 then interlinks the two frames as a vertical split between the master and slave VPU. The split does not have to be an even split of the screen (e.g., 50% rendered by each VPU) and can be dynamically adjusted for every pair of master and slave frames.

Under Horizontal Split Screen Blacking Control, the software drivers determine which upper or lower section of a frame are output from the master and slave VPU. The drivers then clear to black the portions that will not hold valid frame buffer data and the IM 912 mixes the inputs as a horizontal split of the inputs. The split does not have to be an even split of the screen (e.g., 50% rendered by each VPU) and can be dynamically adjusted for every pair of master and slave frames.

Alternate Frame Rendering ("AFR") performs load balancing at a frame level. A "frame" as referred to herein includes a sequence of rendering commands issued by the application before issuing a display buffer swap/flip command. AFR generally passes each new frame through to the output from alternating inputs of the IM 912. One VPU renders the even-numbered frames and the other VPU renders the odd-numbered frames, but the embodiment is not so limited. The AFR allows performance scaling for the entire 3D pipeline, and avoids render-to-texture card-to-card data transfers for many cases.

The IM 912 of an embodiment may perform AFR under Manual Control, Manual Control with automatic VSync switching, or Blacking Control. When using Manual Control, the drivers manually select an input of the IM 912 for a frame after the next VSync. Using AFR using Manual Control with VSync switching, and following a next vertical blank, the IM 912 chooses the input coupled to the master VPU as the output source and then automatically toggles between the master and slave VPU inputs on every VSync. Using Blacking Control, the drivers alternate sending a fully painted frame versus a cleared-to-black frame from the master and slave VPUs; the IM 912 toggles between the master and slave frames as a result.

As described above with reference to FIG. 9, the IM merges streams from multiple VPUs to drive a display. The merging of streams uses Manual AFR compositing and Blacking compositing (FIG. 10) but is not so limited. Both Manual AFR and Blacking compositing support AFR, which includes switching the IM output alternately between two VPU inputs on a frame-by-frame basis. The Blacking with both horizontal screen split and vertical screen split includes a variable split offset controlled by the IM. The Blacking with Super-Tiling includes a variable tile size controlled by the IM.

The control logic including the black register 906 and MUX path logic and black comparator 908 determines the compositing mode of the IM 912 by controlling the MUX 916 to output a frame, line, and/or pixel from a particular VPU. For example, when the TMDS control bits 922 select AFR Manual compositing as described herein, the IM 912 alternately selects each VPU to display alternating frames. As such, system drivers (not shown) determine the VPU source driven to the output. By setting the xAFR_MAS control bit 922 high, the MUX 916 of an embodiment couples the master input port (master VPU output) to the IM output on the next frame to be displayed. In contrast, by setting the xAFR_MAS control bit 922 low, the MUX 916 couples the slave input port (slave VPU output) to the output on the next frame to be displayed.

The AFR_AUTO bit of the TMDS control bits 922 enables automatic toggling that causes the IM output to automatically switch or toggle between the master and the slave inputs on every VSync signal. When the AFR_AUTO bit is asserted the IM begins rendering by coupling to the IM output the input port selected by the xAFR_MAS bit. The IM automatically toggles its output between the master and slave inputs on every VSync signal, thereby ignoring the xAFR_MAS bit until the AFR_AUTO bit is de-asserted. The IM thus automatically controls the display of subsequent frames (or lines) alternately from each VPU.

The AFR Manual mode may also control a single VPU to drive the IM output by setting the AFR_MAN_ON* bit to an asserted state. In contrast to coupling the IM output alternately between two VPUs for each frame, AFR_MAN_ON* hit sets the IM output path according to the state of the xAFR_MAS bit and does not toggle the output between multiple VPUs for subsequent frames or pixels.

The IM of an embodiment supports more advanced merging of streams from multiple VPUs using Blacking compositing. The MUX path logic and black comparator 908, when operating under Blacking, controls the MUX 916 so as to provide the IM output from one of multiple VPUs on a pixel-by-pixel basis. The decision on which pixels are to be displayed from each of a number of VPUs generally is a compare operation that determines which VPU is outputting black pixels. This is a fairly efficient and flexible method of intermixing that allows the drivers to "tune" the divisions, and the blacking can be done by clearing memory to black once per mode set-up and then leaving it until the mode is changed.

The Blacking generally receives a data stream from each of a first VPU and a second VPU, and compares a first pixel from the first VPU to information of a pixel color. The Blacking selects the first pixel from the first VPU when a color of the first pixel is different from the pixel color. However, Blacking selects a second pixel from the second VPU when the color of the first pixel matches the pixel color. The first pixel of the data stream from the first VPU and the second pixel of the data stream from the second VPU occupy corresponding positions in their respective frames. The Blacking thus mixes the received digital video streams to form a merged data stream that includes the selected one of the first and second pixels.

The drivers (e.g., referring to FIG. 1, driver 106 of video processing system 100) corresponding to the IM select Blacking compositing by deactivating the AFR Manual mode at the IM. Deactivation of the Blacking mode is controlled by asserting the AFR_MAN_ON* bit of the TMDS control bits 922. The drivers also set up the frame buffers by setting any pixel of a VPU to black when another one of multiple VPUs is to display that pixel. This is similar in effect to a black chroma key affect but the embodiment is not so limited. If the pixels of all VPUs coupled to the IM are black the IM couples the pixel output from the master VPU to the IM output.

The IM uses the pixel clock and internal control lines to selectively couple an input port to the IM output on a pixel-by-pixel basis. In an example system having two VPUs, the MUX path logic and black comparator 908 performs compare-to-color operations so that output pixels from a first VPU output are compared with the contents of the black register to determine if the output pixels are a particular color. In an embodiment, the compare-to-color operations are compare-to-black operations, but the "black" color may be configurable to any pixel color. If the output pixels are black then the MUX path logic and black comparator 908 controls multiplexer 916 to output pixels (non-black) from the second VPU. When the IM determines the output pixels from the first VPU are not black then the MUX path logic and black comparator 908 controls multiplexer 916 to output the pixels from the first VPU.

Other compositing strategies are available and are not limited by the IM 912. For example, extended interlink modes are also available that go beyond the load sharing usage of the Manual AFR and Blacking modes. These modes, while not the standard interlinking used for pure speed gains by sharing the processing between multiple VPUs, enhance the system quality and/or speed by offloading functionality from the VPUs to the IM 912. As one example of an extended mode, the IM 912 of an embodiment supports the "SuperAA" mode previously referred to in addition to the Manual AFR and Blacking modes.

The multiple VPU systems described herein provide numerous mechanisms for distributing the workload across the VPUs. These load balancing methods include AFR, Scissoring, and Super-Tiling. The Scissoring mode divides the display into some number of portions or parts, where the screen can be split horizontally or vertically using a "balance point" or "split point". In a system having two VPUs, for example, the VPU scissor functionality controls the rendering during horizontal splitting so that one VPU renders only to the top portion and the other VPU renders only to the bottom portion of the screen. Similarly, VPU scissor functionality controls the rendering during vertical splitting so that one VPU renders only to the left portion and the other VPU renders only to the right portion of the screen.

Scissoring modes typically use static balance points that do not change as applications run on the host system. These static balance points may lead to poor performance if the rendering load is not split evenly across the two portions of the screen. While a static balance point can be chosen using application detection, this will not help applications which vary the rendering load while running.

The multiple VPU system of an embodiment uses Dynamic Load Balancing ("DLB") as an improvement to scissoring mode that allows the balance point to vary as applications are running to produce an optimal or near-optimal split of the rendering load between the VPUs. The DLB dynamically determines an appropriate "balance point" or "split point" of the screen and moves or adjusts the balance point per frame so as to approximately equalize the processing (e.g., pixel processing) workload of rendering each portion of the display screen. An IM control algorithm controls the DLB of an embodiment without a direct connection between the VPUs, thereby supporting multiple VPUs that each has no knowledge of other VPUs that may be supporting the host system.

The multiple VPU system provides DLB without a direct connection between the VPUs. Instead each VPU writes a specific identifier to a location in memory at such time as the VPU completes rendering of a current frame. Upon completion of rendering operations for the current frame a determination is made as to which of the multiple VPUs completed rendering operations last based on the identifier read from the memory. Thus, the VPU corresponding to the identifier in memory following rendering of a current frame is the VPU that last finished rendering operations for that frame.

In various embodiments, the identifier could be stored anywhere in the system accessible by all the VPUs in the system, including a system memory location.

Table 2 is an example sequence of commands submitted to the multiple VPU system during frame rendering, under an embodiment.

TABLE 2

|   | VPU 0 | VPU 1 |
|---|---|---|
| 1 | Render VPU 0 portion of Frame N | Render VPU 1 portion of Frame N |
| 2 | Write 0x000000FF to system memory location | Write 0x0000FF00 to system memory location |
| 3 | Synchronize with VPU 1 | Synchronize with VPU 0 |
| 4 | Display Frame N | Display Frame N |

Rendering using DLB selects a compositing mode and initializes the DLB based on information of a detected application running on the host system. Initial instructions from the driver to each VPU specify via the corresponding scissor register which region of the screen is to be rendered by that VPU. The scissor register subsequently controls the VPU to only draw to the appropriate portion of the screen. The remaining region of the screen is set to black at the end of the frame, but before the image is sent to the compositor.

The components of an embodiment may initialize the balance point via writing of a variable to the scissor registers (corresponding to the VPUs) as in a static scissoring mode, but are not so limited. The variables written to the scissor registers, referred to as the "percent on master" variables, represent a percentage of a frame that is rendered by the VPU that corresponds to the scissor register holding the percent on master. The value of the percent on master variable is converted to a number of scan lines to be rendered by the corresponding VPU. The balance point may be set for example so that the master VPU renders 50% of the display and the slave VPU renders the remaining 50% of the display. In another example, the balance point may be set so that the master VPU renders 55% of the display and the slave VPU renders the remaining 45% of the display.

Components of the multiple VPU system (e.g., system driver) dynamically initialize or adjust the balance point for rendering a frame based on information of the rendering of one or more earlier frames. In so doing the driver for example reads a pre-specified location (e.g., register) in system memory to which the VPUs write their respective identifiers in order to determine the last VPU to finish rendering a particular frame. The VPU to last finish rendering will have its processing load reduced on subsequent frames (the next frame the control algorithm generates) as a result of the driver moving the balance point to reduce the portion of the rectangle rendered by the last-finishing VPU. The adjustment of processing load is accomplished by providing different scissor rectangles to each different VPU so that each VPU renders a different portion of the screen. The DLB thus allows for adjustment of how much is rendered with each VPU by adjusting the scissor registers on a per-frame basis.

In an embodiment, the balance point is adjusted for a frame using information of rendering operations from two (2) frames earlier in the processing chain. This allows the system driver and/or other components to work in parallel by having the driver generate rendering commands for frame "N+2" while frame "N" is being rendered.

In adjusting the balance point, components of the multiple VPU system look back two (2) frames earlier, which may include several command buffers. This number of frames allows the system to look backwards in the frame processing chain without having to stop and wait for the VPUs to finish rendering the current frame. The DLB therefore allows the control algorithm and VPU hardware to overlap in terms of frame rendering, so the control algorithm is generating commands for one frame (frame N+1) in advance of the VPU (rendering frame N) rendering the commands. In DLB, after the control algorithm generates frame (N+1) it looks at the results from rendering of frame N to determine any adjustment in balance point needed during rendering of frame (N+2).

Upon completion of frame N rendering operations the system memory is read to determine the last of the multiple VPUs to complete rendering operations for frame N. The last VPU to complete rendering operations corresponds to the identifier read from system memory as described herein. The balance point is adjusted or changed for frame N+2 in order to reduce the number of pixels or portion of the frame rendered by the last VPU to finish rendering of frame N. The balance point of an embodiment is adjusted in increments of one percent (1%) of at least one of the display height (horizontal balance point), display width (vertical balance point), number of lines, and number of pixels, however alternative embodiments may use any percentage of these parameters. This balance point may then be rounded to a VPU family specific pixel boundary.

In embodiments where VPUs are not rendering to shared memory, if an event occurs which requires the rendering from the VPUs to be merged mid-frame (for example, glCopyTexSubImage or other render to texture operation, copying the image of VPU A to VPU B, and copying the image of VPU B to VPU A, resulting in both VPUs having the full image following the copy), the balance point of an embodiment is reset to the original balance point to which the system was initialized. When events occur requiring the rendering from each VPU to be merged mid-frame, both VPUs need to complete rendering of the image in order to continue processing that frame (e.g., a scene that includes a mirror displaying some or all of a screen image). These events typically include rendering of a type of effect that requires all rendered information of a frame. This resetting is performed because the mid-frame merging or copying of data from multiple VPUs is generally fastest when the balance point is set so as to reduce the processing expense of transferring data across the PCIE bus.

The driver of an embodiment may be configured to control the slave VPU to render a smaller portion of the screen in a multiple VPU configuration. Consequently, an embodiment renders the smaller portion of the data (e.g., based on pixel count) on the slave VPU in order to reduce the amount of data transferred across the PCIE bus at the end of a frame. For example, when the balance point is moved so that the master VPU is rendering a smaller portion of the display area than the slave VPU, components of the multiple VPU system may swap the display regions rendered by the master and slave VPUs. Therefore, when a position of the balance point has the master VPU rendering 49% and the slave VPU rendering 51% of the display, the driver swaps the display portions between the VPUs. Following the swap, the master VPU renders the 51% of the display rendered by the slave VPU in the previous frame, while the slave VPU now renders the 49% of the display previously rendered by the master VPU.

Figure 11:
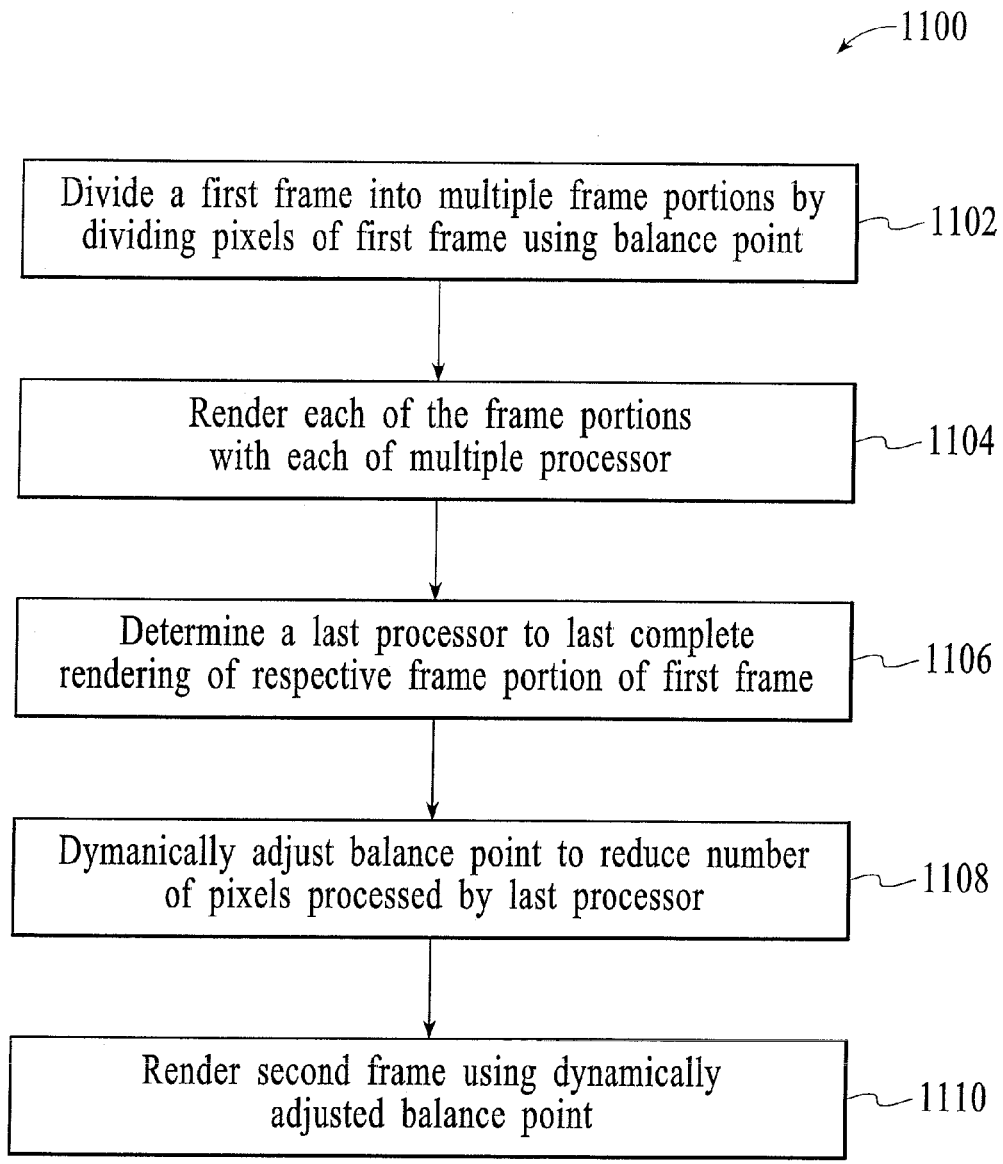
FIG. 11 is a flow diagram of dynamic load balancing (DLB), under an embodiment.

FIG. 11 is a flow diagram of dynamic load balancing 1100, under an embodiment. The DLB 1100 divides 1102 a first frame into multiple frame portions by dividing pixels of the first frame using at least one balance point. The DLB 1100 renders 1104 each of the multiple frame portions using each of the processors. The last processor of the multiple processors to complete rendering of a respective frame portion of the first frame is then determined 1106. Components of the system dynamically determine and adjust 1108 the balance point to reduce a number of pixels processed by the last processor. One or more subsequent frames are rendered 1110 using the dynamically adjusted balance point.

Figure 12A:
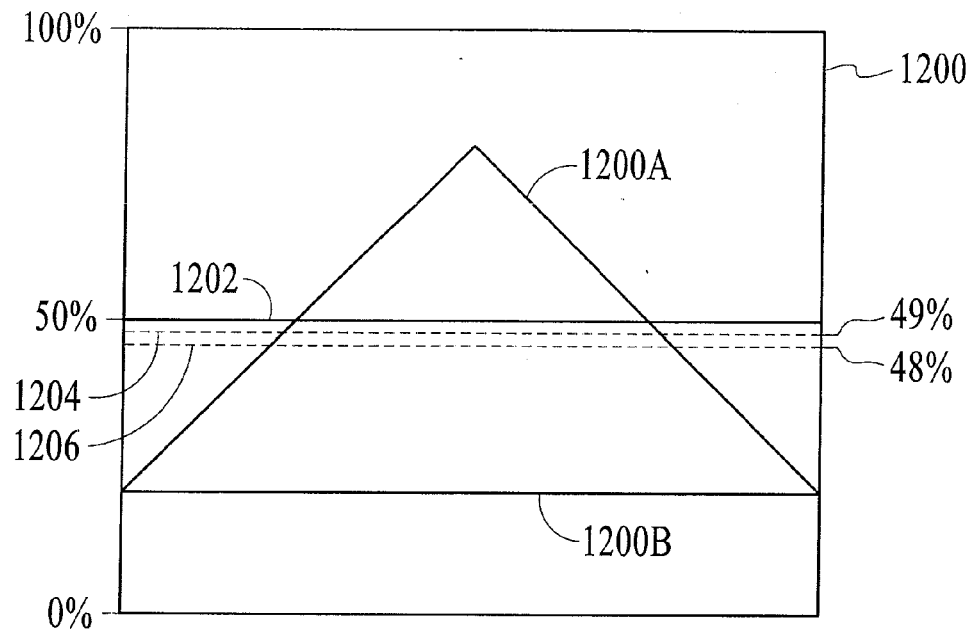
FIG. 12A is an example rendering of a triangle using DLB with a horizontal balance point, under an embodiment.

FIG. 12A is an example rendering of a triangle 1200 using DLB with a horizontal balance point, under an embodiment. The triangle 1700 includes top 1200A and bottom 1200B portions. The balance point 1202 for this example is set so that the slave VPU renders 50% of the display (bottom portion) and the master VPU renders the remaining 50% of the display (top portion). When drawing the triangle 1200, the triangle frames are provided to both VPUs. The master VPU will, as a result of the scissor register setting, render the top 50% of the lines or pixels of the display while at the same time the slave VPU renders the bottom 50% of the lines or pixels of the display.

In this first frame rendering, the slave VPU will be the last to finish processing the frame and writing its identifier to system memory because the slave VPU is processing more pixels (the area of the triangle bottom portion 1200B processed by the slave VPU is larger than the area of the triangle top portion 1200A). As a result of finishing last, the DLB adjusts the balance point 1202 for a subsequent frame via the scissor register settings as described above. The new balance point 1204 reduces the number of lines rendered by the slave VPU by 1% (50%−1%=49%) while increasing the number of lines rendered by the master VPU by 1% (50%+1%=51%).

In the next frame rendering, the slave VPU will again be the last to finish processing the frame and writing its identifier to system memory because the slave VPU is still processing more pixels. As a result of finishing last, the DLB adjusts the balance point 1204 for a subsequent frame via the scissor register settings as described above. The new balance point 1206 reduces the number of lines rendered by the slave VPU by 1% (49%−1%=48%) while increasing the number of lines rendered by the master VPU by 1% (51%+1%=52%). The DLB operations continue as described above.

Figure 12B:
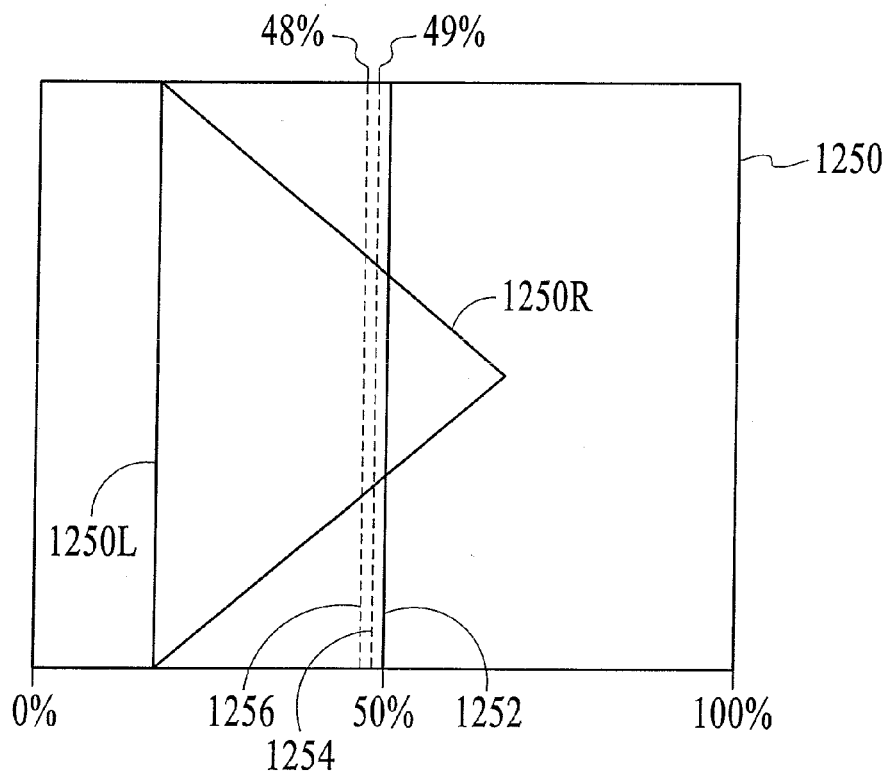
FIG. 12B is an example rendering of a triangle using DLB with a vertical balance point, under an embodiment.

FIG. 12B is an example rendering using DLB with a vertical balance point, under an embodiment. The triangle 1250 includes right 1250R and left 1250L portions. The balance point 1252 for this example is set so that the slave VPU renders 50% of the display (left portion) and the master VPU renders the remaining 50% of the display (right portion). The master VPU renders the right 50% of the lines or pixels of the display while at the same time the slave VPU renders the left 50% of the lines or pixels of the display.

In the first frame rendering, the slave VPU will be the last to finish processing the frame and writing its identifier to system memory because the slave VPU is processing more pixels (the area of the triangle left portion 1250L processed by the slave VPU is larger than the area of the triangle right portion 1250R). As a result of finishing last, the DLB adjusts the balance point 1252 for a subsequent frame via the scissor register settings as described above. The new balance point 1254 reduces the number of lines rendered by the slave VPU by 1% (50%−1%=49%) while increasing the number of lines rendered by the master VPU by 1% (50%+1%=51%).

In the next frame rendering, the slave VPU will again be the last to finish processing the frame and writing its identifier to system memory because the slave VPU is still processing more pixels. As a result of finishing last, the DLB adjusts the balance point 1254 for a subsequent frame via the scissor register settings as described above. The new balance point 1256 reduces the number of lines rendered by the slave VPU by 1% (49%−1%=48%) while increasing the number of lines rendered by the master VPU by 1% (51%+1%=52%). The DLB operations continue as described above.

When DLB is used in systems having more than two VPUs, the driver continues to adjust the balance point based on information of the last VPU to write its identifier to a location in system memory. The portion of the rendering taken from the last VPU to write in these embodiments is evenly distributed among the other VPUs of the system, but is not so limited.

Referring again to FIG. 9, the IM 912 supports multiple input modes and single or dual link TMDS widths, depending on the input connectivity. The IM 912 also includes counters that monitor the phase differences between the HSyncs and VSyncs of the two inputs. The counters may include a pixel/frame counter to assist in matching the clocks on the two input streams.

With reference to Table 3, in one embodiment, the IM 912 has three counters 910. Each counter increments the master pixel clock and uses one of the VSyncs for latching and clearing.

If a read of an I2C counter is occurring, the update to that register is held off until after the read is completed. If a write of the register is occurring, then the read is delayed until the write is completed. Read delays are only a few IM internal clocks and therefore are transparent to software.

TABLE 3

| IM Counters | | | |
|---|---|---|---|
| Counter Name | Bits | Clock | Description |
| CLKS_PER_FRAME_CTR | 22 | Master Pixel | Number of master clocks per 1 slave frame uses slave VSync to determine frame edges every slave VSync latches the count to CLKS_PER_FRAME and resets this counter |
| S2M_VSYNC_PHASE_CTR | 11 | Master Pixel | Number of lines displayed between slave VSync and master VSync latched to S2M_VSYNC_PHASE every master VSync resets the count to 0 every slave VSync |
| S2M_HSYNC_PHASE_CTR | 12 | Master Pixel | Number of pixels displayed between slave HSync and master HSync latched to S2M_HSYNC_PHASE every master HSync resets the count to 0 every slave HSync |

The IM 912 may be used in a number of configurations as described above. In one configuration, referred to herein as a "dongle", the IM 912 receives two separate TMDS outputs, one each from two separate VPUs, and brings them onto the dongle through two TMDS receivers. The separate receivers then output two DVO streams directly into the IM 912 of the dongle. The IM 912 mixes the two received inputs into a single output stream. The output DVO signals from the IM 912 are then fed either to a TMDS transmitter or through a DAC, both of which drive out through a standard DVI-I connector on the dongle.

In another configuration, referred to herein as an "on-card" configuration, the IM 912 receives two streams of DVO signals directly from two VPUs that reside on the same card as the IM 912. This on-card configuration does not use TMDS transmitters or receivers between the VPUs and the IM 912, in contrast to the dongle configuration. The IM 912 mixes the two received inputs into a single output stream. The output DVO signals from the IM 912 are then fed either to a TMDS transmitter or through a DAC, both of which drive out through a standard DVI-I connector for example.

The input streams received at the IM 912 inputs are referred to herein as the "master input" and the "slave input", and are received from the master and slave VPUs, respectively. The master and slave VPUs may be on two separate cards or on a single "super" card. Either VPU can function as the master or slave VPU.

The master VPU is used as the primary clock to which the slave is synchronized ("synced"). The master clock is not adjusted or tuned other than the normal card initialization process. The slave VPU is adjusted to run slightly ahead of the master VPU to allow for synchronization and FIFO latencies. The slave VPU uses a larger FIFO in order to compensate for variances between the pixel clock rates of the two VPUs, while the master VPU path uses a shallow FIFO to synchronize the master input clock domain to the internal DVO clock domain. Flow control between the master and slave VPUs includes initial synchronization of the two VPUs and then ongoing adjustments to the slave VPU to match the master VPU. The flow control includes clock adjustments via a pixel hold off signal generated by the IM 912 or driver action in response to counters within the IM 912.

The IM 912 as described above supports numerous operational modes, including Pass-through Mode and various Interlink Modes, as illustrated in Table 1. These operational modes are set through a combination of I2C register bits and the TMDS Control Bits as described herein.

Pass-through Mode is a mode in which an input of the IM 912 is passed directly through to the output (monitor). The input port used is chosen at power-up by the initial toggling of an I2C clock. The path can be changed again by switching an ENABLE_INTERLINK register from "1" back to "0" and then toggling the I2C clock of the desired port.

Interlink Modes include numerous modes in which the IM 912 couples inputs received from the master and slave VPUs to an output in various combinations. Dual VPU Interlink Modes of an embodiment include but are not limited to Dual AFR Interlink Mode and Dual Blacking Interlink Mode.

Dual VPU Interlink Modes are modes in which both VPUs are being used through manual AFR control or through blacking modes. Both IM 912 ports are output continuously during operations in these modes.

Dual AFR Interlink Mode includes modes in which the source of the IM 912 output is alternated between the two input ports. It can either be done manually by the IM 912 drivers or automatically once started based on VSync. Control of the Dual AFR Interlink Mode includes use of the following bits/states: AFR_MAN_ON*=low; AFR_AUTO*=high or low; AFR_MAS (used to control which card is outputting at the time or to set the first card for the Auto switch).

Figure 13:
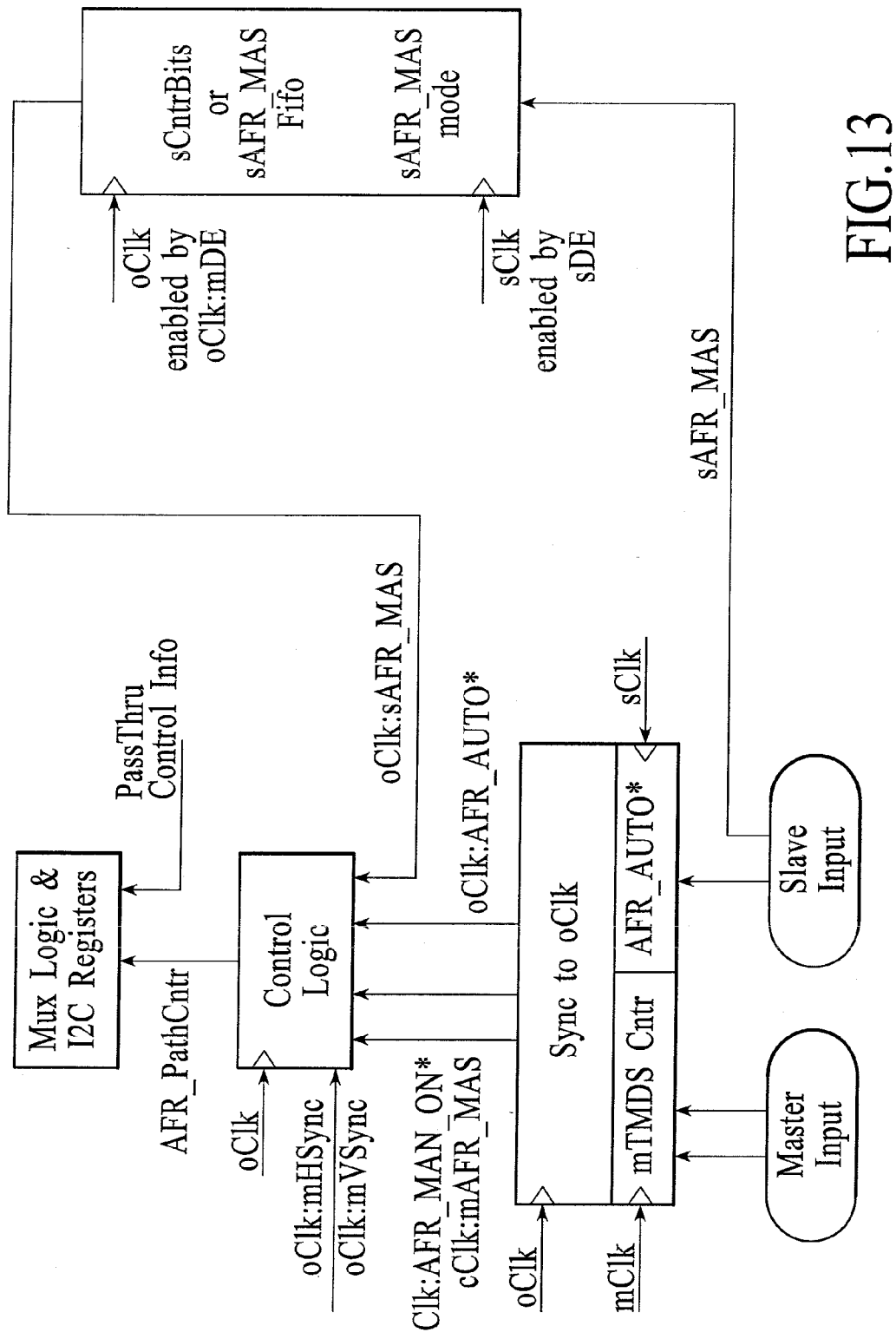
FIG. 13 is a block diagram of path control logic of an interlink module (IM) according to an embodiment.

FIG. 13 shows path control logic of the IM, under an embodiment. The oClk signal is the output pixel clock. It is generated in slave passthru directly from the sClk from the slave port. In interlink or master pass-through modes, it is generated directly from the mClk from the master port with the same timings. oClk:mDE is the master port's mDE signal synchronized into the oClk time domain.

Dual Blacking Interlink Mode includes modes in which both VPUs output in parallel and the IM 912 forms an output by selecting pixels on a pixel-by-pixel basis by transmitting black pixel values for any pixel of any VPU that should not be output. Control of the Dual Blacking Interlink Mode includes use of the following bit/state: AFR_MAN_ON*=high.

AFR_MAN_ON* is sent across the master TMDS Control Bit bus on bit no 2. It is clocked in with mClk, one clock before the rising edge of mDE after the rising edge of mVSync. The action in response to it takes place before the first pixel of this mDE active period hits the MUX. Other than this specific time, there is no direct response to AFR_MAN_ON*.

When AFR_MAN_ON* is active (LOW) and ENABLE_INTERLINK is set to 1 and the ExtendedModes bit is 0, then the path set by the pixel MUX is controlled by the xAFR_MAN bits as described below.

The I2C register reflects the result after the resulting action occurs. It does not directly reflect the clocked in bit.

AFR_AUTO* is sent across the slave TMDS Control Bit bus on bit no 2. It is clocked in with sClk timings and then synced to mClk. It is latches in the clock before mDE goes high after the rising edge of mVSync. The action in response to it then occurs before the first pixel associated with the active mDE hits the MUX and only if AFR_MAN_ON* is low on the same latching point.

When AFR_AUTO* and AFR_MAN_ON* are active and ENABLE_INTERLINK is set to 1 and extended interlink modes are not active, then the path set by the pixel MUX is initially set to the master path. The path is then automatically toggled on every rising edge of mDE after the rising edge of mVSync until AFR_AUTO* is deasserted.

The I2C register reflects the result after the resulting action occurs. It does not directly reflect the clocked in bit.

The mAFR_MAS is set from the master port on mLCTL[1] and sAFR_MAS is set from the slave port on sLCTL[1]. These two bits control which path is set by the pixel MUX when in Interlink mode, manual AFR control.

The mAFR_MAS is clocked directly in with mCLK. The sAFR_MAS is clocked in with sCLK and then synced to mCLK. The bits are latched on the rising clock edge before the rising edge of mDE. Both latched bits then go into a logic block which detects a bit changing state. Depending on an I2C register bit, either after the rising edge of a VSync or an HSync, if a bit is detected as having its state changed, the logic sets the pixel MUX when in AFR_MANUAL Interlink mode to match the path of the toggled bit. The MUX will not change during AFR_MANUAL interlink mode at any other time.

If both bits toggle in the same updating time frame, then the master path is set.

Unlike the other control bits, the I2C register reflects the individual synchronized bits going into the MUX control logic block clocked in with MClk and not the bits after the sync state.

Regarding data and control paths in the IM 912 of an embodiment, the Dual VPU Interlink Mode works in routing modes that include pass-through, dual/single input AFR Manual interlink, and dual input Blacking Interlink. These routing modes describe which of the data and control lines from the two receivers get transmitted out of the IM 912 via the transmitter or DAC. Table 4 chows the data, control, and clock routing by muting mode of the IM 912, under an embodiment.

The clock is the pixel clock, the internal control lines are the lines that connect between the TMDS transmitter and receivers (and IM 912), and the external control lines are lines that are not processed by the TMDS circuitry such as I2C and Hot Plug. The Slave pixel hold off signal goes directly between the IM 912 and the Slave DVI VSync pin.

TABLE 4

| Routing Mode | Clock | Internal Control | Bypass Control | Data | Notes |
|---|---|---|---|---|---|
| Pass-Through | Master or Slave | Master or Slave | Master or Slave | Master or Slave | Set by first I2C clock toggling |
| AFR Manual | Master or Slave | Master or Slave | Master or Slave | Master or Slave | Set by AFR_MAN control bit |
| Blacking | Master | Master | Master | Master and Slave | Data is interlinked depending on black pixels |

Pass-Through occurs when using the IM 912 in single-VPU Mode and before the drivers set up the IM 912 and VPUs for the dual-VPU mode. At power up, the IM 912 defaults the MUX to pass all data and control lines directly from the master VPU to the output of the IM 912. As soon as the IM 912 sees one of the input TMDS I2C clocks toggling, it sets the MUX to pass that specific channel to the output. This includes the clock and all control signals, whether it is from the master or slave VPU. This allows the IM 912 to connect the default video card of the system directly through to the monitor during power-up BIOS operation, even before the drivers are aware of existence of the IM 912.

In the Dual VPU Interlink Mode, once the drivers are loaded, the drivers can detect if the IM 912 exists and if there are one or two connections to the IM 912. The detection is done by reading the I2C ID register of the IM 912 through the port of each VPU. The drivers can determine which discovered connection is the master and which is the slave by the value of bit 0 of the IM 912 ID register read on each port.

If only one connection is found, the IM 912 is left in Pass-through mode. If two connections are found to the IM 912, the driver then takes over the screen control, setting the MUX of the IM 912 to output from the master port, with the VPU connected to the master port as the master VPU. The clock is driven from this port until the power is lost or one of the input connections to the IM 912 is broken.

The MUX of an embodiment is set by mechanisms that include Pass-Through initial states, AFR Manual Control, and Blacking Control. These modes and the particular controls for each are set through the TMDS CNTR bits, with the IM 912 responding on the next vertical blanking period. The master/slave switch (AFR_MAS) can latch in/occur on either the next HSync or the next VSync depending on the I2C control bits setting.

In addition to using TDMS control registers, the drivers also control and monitor the IM functionality using I2C control registers.

I2C registers are used for control and monitoring that does not need to happen every frame or faster. The registers can be available through both the master and slave ports of the IM.

For more dynamic control, the I2C control registers are used to set different multiVPU modes and to manually switch the IM data path.

In one embodiment of a video processing system, inter-integrated circuit communication for the IM is accomplished using an Inter-Integrated Circuit (I2C) bus. I2C is a bus typically used to connect integrated circuits (ICs). I2C is a multi-master bus, which means that multiple ICs can be connected to the same bus and each one can act as a master by initiating a data transfer.

Figure 14:
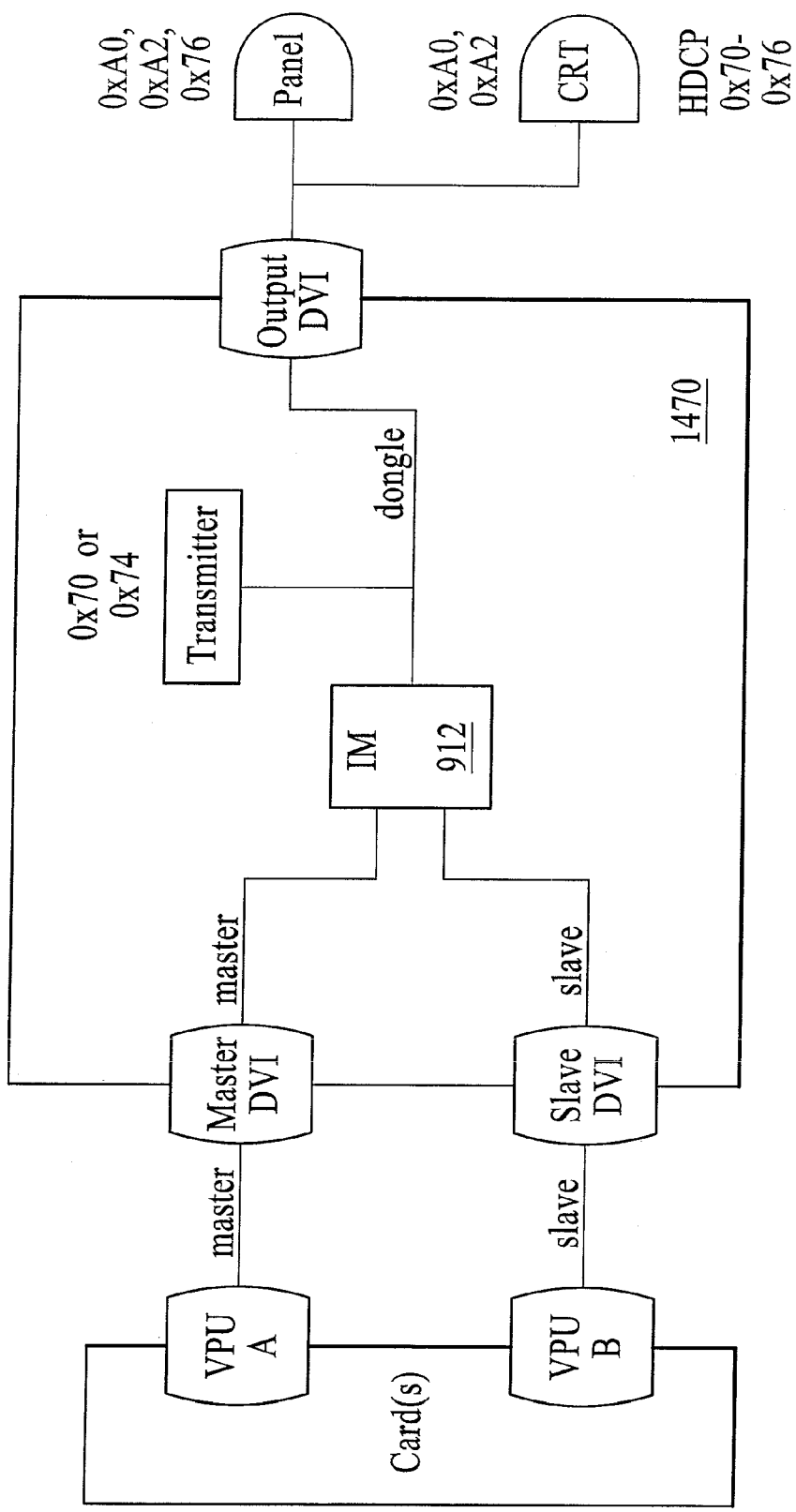
FIG. 14 is a block diagram of I2C paths according to a dongle embodiment.

FIG. 14 is diagram of an embodiment of an IM 912 on a dongle 1470, showing various I2C paths. The dongle 1470 receives data from a master VPU A and a slave VPU B. In an embodiment, the master VPU A and the slave VPU B reside on one or more VPU card(s). In an embodiment, there are three separate I2C buses for the IM 912. There is an I2C bus from each of two input ports, a master input port and a slave input port. A third I2C bus goes from the IM 912 to a transmitter, and to any connected output device, such as panel and/or cathode ray tube (CRT).

The two input I2C buses each feed through the DVI master and slave input ports into the dongle 1470 and directly into the IM 912 on two separate channels.

Figure 15:
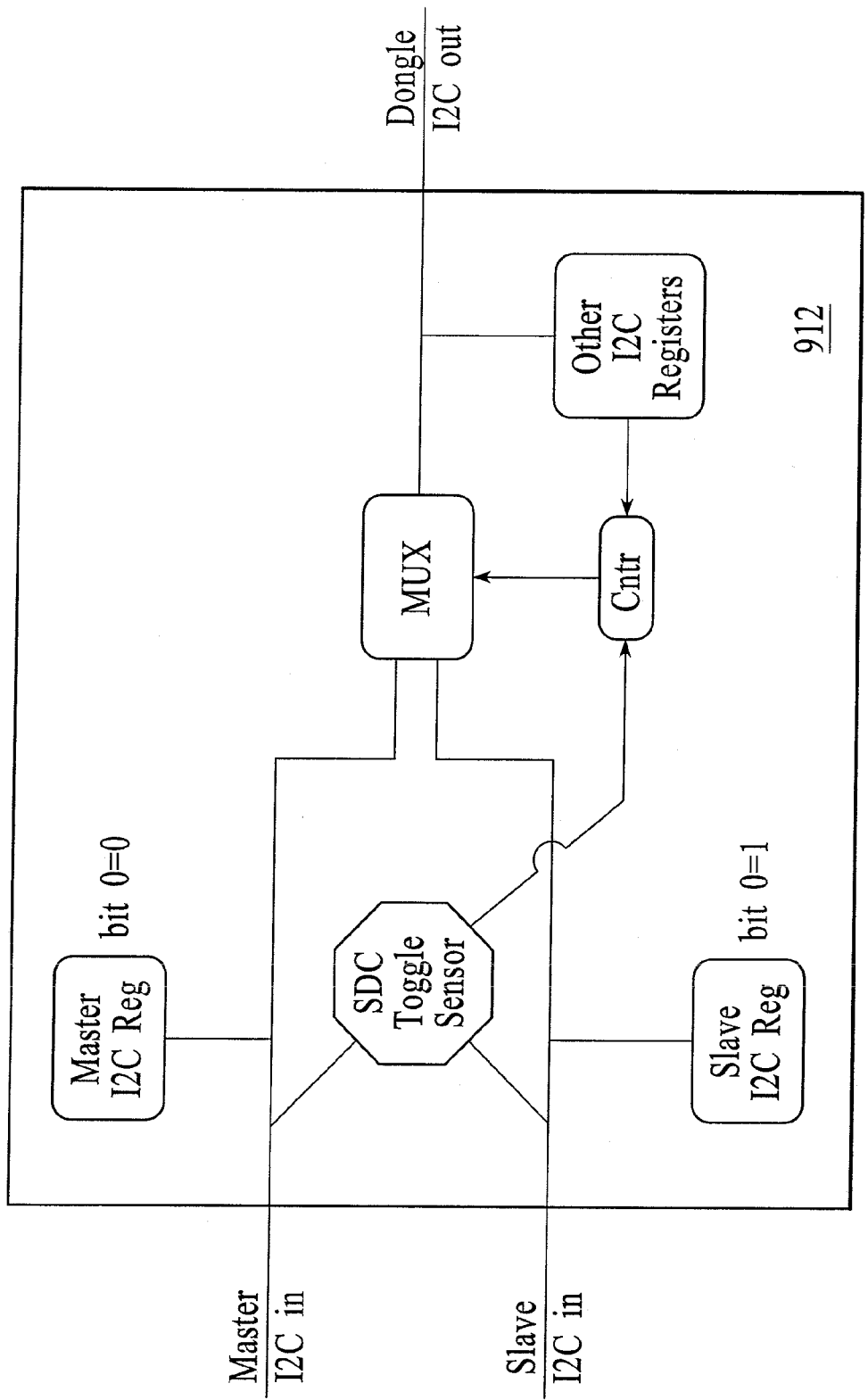
FIG. 15 is a block diagram of I2C paths of an interlink module (IM) according to an embodiment.

FIG. 15 is a diagram of I2C paths within the IM 912 according to an embodiment. The IM 912 includes a master identification (ID) I2C register and a slave ID I2C register. The IM 912 further includes an SDC toggle sensor, a MUX, and other I2C registers.

Either of VPU A or VPU B can access the ID registers directly through respective input ports without concern for I2C bus ownership.

The IM 912 has one set of registers which are I2C accessible at a particular I2C device address. All other addresses are passed through the IM 912 onto the I2C output port.

The master ID register and the slave register each have the same internal address, but are accessible only from their own respective I2C buses (slave or master).

Other than an IM_xxx_ID registers (offset 0) and the I2C_Reset register, the I2C bus is arbitrated on an I2C cycle-by-cycle basis, using a first-come, first-served arbitration scheme.

For read cycles of the multi-byte registers, the ownership is held until the last byte is read. Software drivers insure that all bytes are fully read in the bottom to top sequence. If all bytes are not fully read in the bottom to top sequence, the bus may remain locked and the behavior may become undefined.

For accesses that are passed through the IM 912 to external devices, the IM 912 does not understand page addressing or any cycle that requires a dependency on any action in a prior access (cycles that extend for more than one I2C stop bit). Therefore a register bit (CONTROL_BITS_2:Bit 0:I2C_LOCK) is added. The software sets this register bit if a multi-I2C access is needed. When this register bit is set, the bus is given to that port specifically until the bit is unset, at which time the automatic arbitration resumes. In a case where both ports try to set this bit, then the standard arbitration method determines which gets access, and a negative acknowledgement (NACK) signal is sent to let the requester know it was unsuccessful.

A specific I2C_Reset register is used in a case of the I2C bus becoming locked for some unexpected reason. Any read to this register, regardless of I2C bus ownership, will always force the I2C state machines to reset and free up the I2C bus ownership, reverting back to the automatic arbitration.

For the other I2C registers, the I2C bus ownership is dynamically arbitrated for on a first-come, first-served fashion. The input port accessing the other registers first with a clock and start bit gets ownership for the duration of the current I2C cycle (that is, until the next stop bit). For multiple-byte read registers (counters) on the IM 912, the ownership is maintained from the first byte read until the final byte of the register has been read.

If an I2C access starts after the bus has been granted to another input port, then a negative acknowledgement (NACK) signal is sent in response to the access attempt. The data for a read is undefined and writes are discarded.

The IM 912 supports single non-page type I2C accesses for accesses off of the IM 912. To allow for locking the I2C bus during multiple dependent type I2C cycles, if an input port sets an I2C_LOCK bit (I2C_CONTROL_2:bit 0) to 1, the I2C bus is held in that port's ownership until the same port sets the same bit back to 0. This register follows the same first-come, first-served arbitration protocol.

If the I2C_RESET register is read from either port (no arbitration or ownership is required), then the I2C state machine is reset and any I2C ownerships are cleared.

Figure 16:
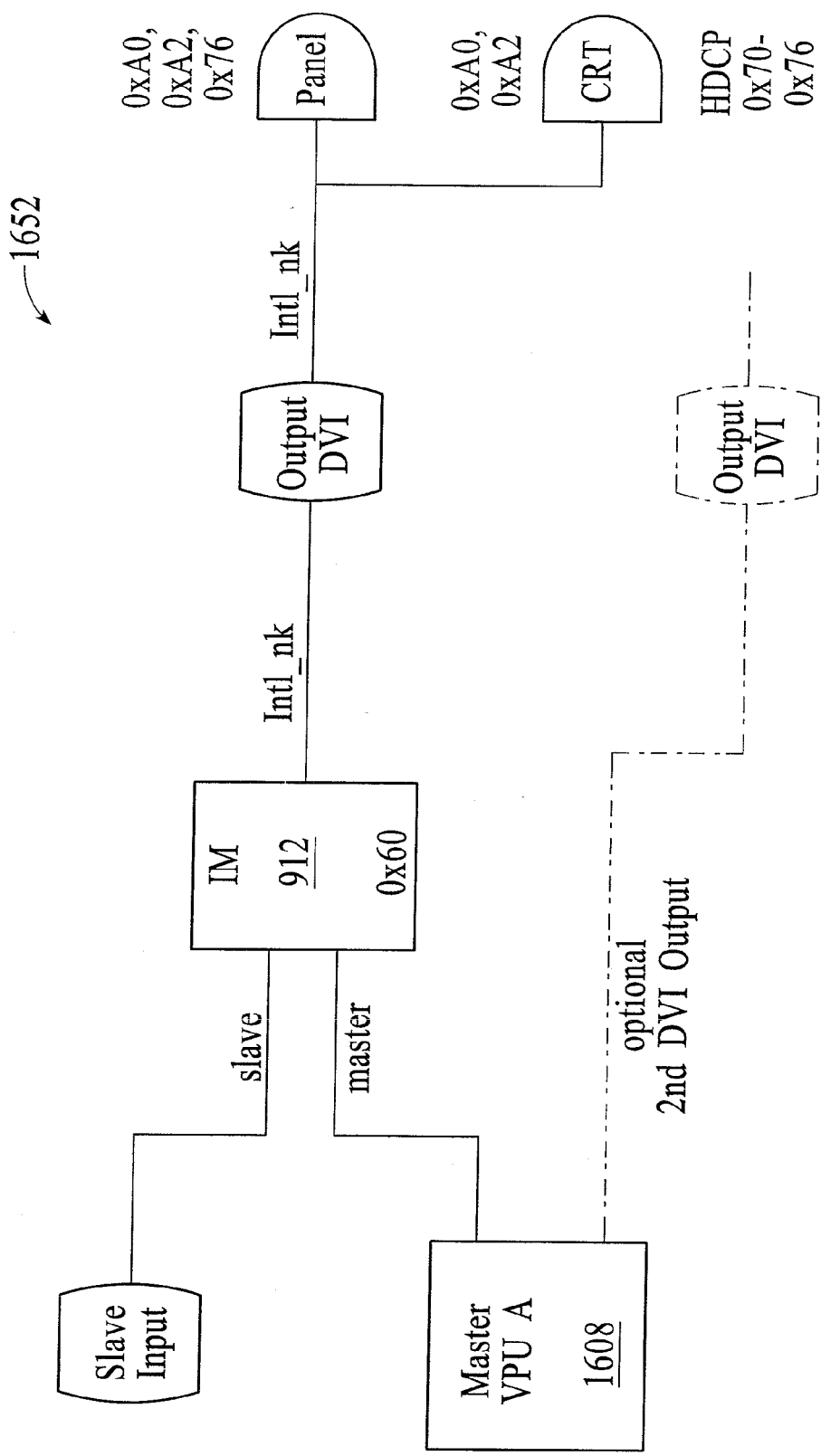
FIG. 16 is a block diagram of I2C paths on a VPU card according to an embodiment.

FIG. 16 is a diagram of I2C bus paths for a configuration in which a master VPU A and an IM 912 are on the same VPU card 1652 according to an embodiment.

The VPU card 1652 could be part of the system 300 (FIG. 3), for example. The VPU card 1652 includes a master VPU 1608, an IM 912, a DVI transmitter and optional DVI transmitter. There are three I2C buses (master, slave, and interlink), as shown entering and existing the IM 912. In one embodiment, the interlink I2C bus is a continuation of the master I2C bus or slave I2C bus, depending on which bus is first accessed.

All IM 912 I2C registers are available to either the slave or master I2C ports. Standard NACK responses are used if the I2C bus is currently in use by the other path. An IM 912 device ID is an exception and can be accessed by either port at the same time.

In order to optionally verify that an I2C cycle has completed successfully, all write registers are readable back. Since the I2C registers on the IM 912 do not time out, this matches the current method of I2C accesses used on various conventional video cards. The read back should not be necessary to verify writes.

The IM 912 I2C resets its state machine (not shown) every time it gets a stop bit. This occurs at the start and end of every I2C cycle, according to known I2C protocol.

A CONTROL_ONESHOTS register (not shown) has a different behavior from the other read/write registers. Once written to, the IM 912 latches its results to internal control bits. The CONTROL_ONESHOTS registers themselves are cleared on the next read of this register (allowing for confirmation of the write).

The internal copies of the CONTROL_ONESHOTS bits are automatically cleared by the IM 912 once the IM 912 has completed the requested function and the CONTROL_ONESHOTS register corresponding bits are cleared. The IM 912 does not re-latch the internal versions until the I2C versions are manually cleared.

The IM has one set of registers which are I2C accessible. The IM_MASTER_ID and IM_SLAVE_ID registers have the same internal address but are accessible only from their own I2C bus (e.g., slave or master).

The rest of the registers are only accessible from one side (master or slave) at a time.

In order to verify that an I2C cycle has completed successfully, all write registers must also be readable back to verify the updated values. Since the I2C registers on the IM do not time out, this is consistent with conventional methods of I2C accesses used on various existing video cards. If needed, the read back should not be necessary to verify the writes.

The IM I2C also resets its state machine every time it gets a stop bit. This happens as per I2C protocol at the start and end of every I2C cycle.

The CONTROL_ONESHOTS register has a different behavior from the other read/write registers. Once written to, the IM latches its results to internal control bits. The CONTROL_ONESHOTS are cleared on the next read of this register (allowing for confirmation of the write).

The internal copies of the CONTROL_ONESHOTS bits are automatically cleared by the IM once the IM has completed the requested function and the CONTROL_ONESHOTS register corresponding bits are cleared.

In a dongle configuration, such as in systems 700 and 800, for example, the TMDS control bits are transmitted through the TMDS interface into the IM. The software (driver) sets the registers within the VPU for the desired control bit values and the results arrive at the TMDS receivers on the dongle and are latched into the IM. The AFR_MAN_ON* and AFR_AUTO* are latched on the rising edge of the TMDS VSync. No pixel data is being transmitted at this time. AFR_MAS is latched in on the rising edge of either HSync or VSync, depending on the setting in the I2C Control_Bits register, bit 5.

If the interlink_mode is not enabled (I2C register set), then the bits will be ignored until it is enabled and will take place on the next VSync.

If the interlink_mode is enabled, then the affect occurs on the very next pixel data coming out of the IMs after the VSync or HSync as is appropriate.

If in pass-thru modes, the Syncs used are from the active path. If in AFR_MANual or blacking interlink modes, then the Syncs used are always from the master path.

Aspects of the invention described above may be implemented as functionality programmed into any of a variety of circuitry, including but not limited to programmable logic devices (PLDs), such as field programmable gate arrays (FPGAs), programmable array logic (PAL) devices, electrically programmable logic and memory devices and standard cell-based devices, as well as application specific integrated circuits (ASICs) and fully custom integrated circuits. Some other possibilities for implementing aspects of the invention include: microcontrollers with memory (such as electronically erasable programmable read only memory (EEPROM)), embedded microprocessors, firmware, software, etc. Furthermore, aspects of the invention may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the invention is not intended to be exhaustive or to limit the invention to the precise form disclosed. While specific embodiments of and examples for, the invention are described herein for illustrative purposes, various equivalent modifications are possible within the scope of the invention, as those skilled in the relevant art will recognize. The teachings of the invention provided herein can be applied to other systems, not only for the system including graphics processing or video processing as described above.

For example, a video image produced as described herein may be output to a variety of display devices, including computer displays that display moving pictures and printers that print static images.

The various operations described may be performed in a very wide variety of architectures and distributed differently than described. As an example, in a distributed system a server may perform some or all of the rendering process. In addition, though many configurations are described herein, none are intended to be limiting or exclusive. For example, the invention can also be embodied in a system that includes an integrated graphics processor (IGP) or video processor and a discrete graphics or video processor that cooperate to produce a frame to be displayed. In various embodiments, frame data processed by each of the integrated and discrete processors is merged or composited as described. Further, the invention can also be embodied in a system that includes the combination of one or more IGP devices with one or more discrete graphics or video processors.

In other embodiments not shown, the number of VPUs can be more than two.

In other embodiments, some or all of the hardware and software capability described herein may exist in a printer, a camera, television, handheld device, mobile telephone or some other device. The video processing techniques described herein may be applied as part of a process of constructing animation from a video sequence.

The elements and acts of the various embodiments described above can be combined to provide further embodiments. These and other changes can be made to the invention in light of the above detailed description.

All of the U.S. patent applications cited herein are hereby incorporated by reference in their entirety.

In general, in the following claims, the terms used should not be construed to limit the video processing method and system to the specific embodiments disclosed in the specification and the claims, but should be construed to include any processing systems that operate under the claims to provide video processing. Accordingly, the video processing method and system is not limited by the disclosure, but instead the scope of the video processing method and system is to be determined entirely by the claims.

While certain aspects of the method and apparatus for video processing are presented below in certain claim forms, the inventors contemplate the various aspects of the method and apparatus for video processing in any number of claim forms. For example, while only one aspect of the method and apparatus for video processing may be recited as embodied in computer-readable medium, other aspects may likewise be embodied in computer-readable medium. Accordingly, the inventors reserve the right to add additional claims after filing the application to pursue such additional claim forms for other aspects of the method and apparatus for video processing.

What is claimed is:

1. A device comprising:
a plurality of processors that each couple to receive commands and data that correspond to frames of video that each comprise a plurality of pixels; and
an interlink module coupled to receive processed data corresponding to each frame from each of the processors, the interlink module dividing a first frame into a plurality of frame portions by dividing pixels of the first frame using at least one balance point, the interlink module dynamically determining a position for the balance point that minimizes a difference between a workload of any of the processors during processing of commands and data of at least one subsequent frame, the interlink module further configurable to perform mixing of frame data,
wherein a first of the plurality of processors operates in pass-through mode on a condition that the interlink module disables ones of the plurality of processors,
wherein each of said plurality of processors render a divided portion of a first frame using the at least one balance point and wherein the interlink module dynamically adjusts the balance point in the first frame using rendering information of a second frame, wherein the second frame precedes the first frame,
wherein a driver provides the commands and data to the plurality of processors via a plurality of ring buffers, the ring buffers including at least a first ring buffer for the first of the plurality of processors.

2. The device of claim 1, wherein the interlink module determines a last processor of the plurality of processors to complete rendering of a respective frame portion of the first frame.

3. The device of claim 2, wherein the last processor writes an identifier to at least one memory location.

4. The device of claim 3, wherein determining the last processor comprises reading the identifier from the memory location following the rendering.

5. The device of claim 2, wherein the interlink module dynamically adjusts the balance point to reduce a number of pixels processed by the last processor.

6. The device of claim 5, wherein the interlink module renders a second frame using the dynamically adjusted balance point.

7. The device of claim 1, wherein the dividing comprises horizontal dividing.

8. The device of claim 1, wherein the dividing comprises vertical dividing.

9. The device of claim 1, wherein the interlink module dynamically and incrementally adjusts the balance point using at least one of display height, display width, number of lines, and number of pixels.

10. The device of claim 1, further comprising: determining that a second processor is rendering a smaller portion of the first frame than a first processor; and swapping display regions rendered by the first processor and the second processor.

11. A device comprising:
a plurality of processors that are coupled to receive commands and data that correspond to frames of video that each comprise a plurality of pixels; and
an interlink module coupled to receive processed data corresponding to each frame from each of the processors, the interlink module dividing a first frame into a plurality of frame portions by dividing pixels of the first frame using at least one balance point, the interlink module determining a last processor of the processors to complete rendering of a respective frame portion of the first frame using the balance point, the interlink module dynamically adjusting the balance point to reduce a number of pixels processed by the last processor and controlling rendering of a second frame using the dynamically adjusted balance point of the frame that succeeds the first frame, the interlink module further configurable to perform mixing of frame data,
wherein a first of the plurality of processors operates in pass-through mode on a condition that the interlink module disables ones of the plurality of processors, wherein a driver provides the commands and data to the plurality of processors via a plurality of ring buffers, the ring buffers including at least a first ring buffer for the first of the plurality of processors.

* * * * *